United States Patent
Nishida et al.

(10) Patent No.: US 6,965,419 B2
(45) Date of Patent: Nov. 15, 2005

(54) ACTIVE MATRIX LIQUID CRYSTAL DISPLAY PANEL

(75) Inventors: Shinichi Nishida, Tokyo (JP); Teruaki Suzuki, Tokyo (JP); Masayoshi Suzuki, Tokyo (JP); Makoto Watanabe, Tokyo (JP); Eriko Fujimaki, Tokyo (JP); Yoshihiko Hirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/879,209

(22) Filed: Jun. 30, 2004

(65) Prior Publication Data

US 2004/0252260 A1 Dec. 16, 2004

Related U.S. Application Data

(62) Division of application No. 08/960,224, filed on Oct. 29, 1997, now Pat. No. 6,842,207.

(30) Foreign Application Priority Data

Oct. 29, 1996 (JP) ............................................. 8-286642
Feb. 13, 1997 (JP) ............................................. 9-029032

(51) Int. Cl.⁷ ...................... G02F 1/1343; G02F 1/1335
(52) U.S. Cl. ........................................ 349/106; 349/141
(58) Field of Search .................................. 349/141, 106

(56) References Cited

U.S. PATENT DOCUMENTS

| | | | |
|---|---|---|---|
| 4,632,514 A | 12/1986 | Ogawa et al. | |
| 4,844,569 A | 7/1989 | Wada et al. | |
| 5,013,138 A | 5/1991 | Roosen et al. | |
| 5,040,875 A | 8/1991 | Noguchi | |
| 5,085,973 A | * 2/1992 | Shimizu et al. | ........... 430/271.1 |
| 5,506,706 A | 4/1996 | Yamahara et al. | |

(Continued)

FOREIGN PATENT DOCUMENTS

| | | |
|---|---|---|
| CN | 1098510 A | 2/1995 |
| CN | 1128360 A | 8/1996 |

(Continued)

OTHER PUBLICATIONS

M. Oh-e et al., "Principles and Characteristics of Electro-Optical Behaviour with In-Plane Switching Mode", ASIA Display '95, 1995, pp. 577–580.

*Primary Examiner*—Dung T. Nguyen
*Assistant Examiner*—Mike Qi
(74) *Attorney, Agent, or Firm*—Sughrue Mion, PLLC

(57) ABSTRACT

An active matrix liquid crystal display panel by which a good display characteristic can be obtained without suffering from gradation reversal over a wide visibility angle range. A liquid crystal layer 4 is formed such that the thickness thereof varies in accordance with transmission wavelengths of color layers 6, 7 and 8 so that a very good display which does not exhibit any coloring in whichever direction it is viewed may be obtained.

An active matrix substrate A includes a plurality of opposing electrodes 2, a plurality of pixel electrodes 3 parallel to the opposing electrodes 2, a thin film transistor, and an orientation film 23 all formed on a glass substrate 10. A color filter substrate C includes an orientation film 56 provided on one surface of another glass substrate 10 and an optical compensation layer 35 provided on the other surface of the glass substrate 10 and formed from a plastic film. The two substrates are disposed such that the orientation films thereof oppose each other, and polarization plates 34 and 5 are disposed on the outer sides of the two substrates, and a liquid crystal layer 4 having a positive refractive index anisotropy is provided between the orientation films 23. The optical compensation layer 35 has a negative one axial refractive index anisotropy and can cancel a retardation produced in the liquid crystal layer 4 thereby to suppress white floating of a black display portion.

2 Claims, 26 Drawing Sheets

U.S. PATENT DOCUMENTS

| | | | |
|---|---|---|---|
| 5,745,200 A | | 4/1998 | Kikuchi et al. |
| 5,870,160 A | * | 2/1999 | Yanagawa et al. .......... 349/141 |
| 5,986,733 A | | 11/1999 | Winker et al. |
| 6,005,650 A | | 12/1999 | Kim et al. |
| 6,034,756 A | | 3/2000 | Yuan et al. |
| 6,137,554 A | | 10/2000 | Nakamura |
| 6,137,560 A | * | 10/2000 | Utsumi et al. ............... 349/181 |

FOREIGN PATENT DOCUMENTS

| | | |
|---|---|---|
| JP | 60-159823 | 8/1985 |
| JP | 60-159827 | 8/1985 |
| JP | 60-159831 | 8/1985 |
| JP | 60-202423 | 10/1985 |
| JP | 62-127716 | 6/1987 |
| JP | 64-15719 | 1/1989 |
| JP | 1-277283 | 11/1989 |
| JP | 2-211423 | 8/1990 |
| JP | 4-362919 | 12/1992 |
| JP | 5-181129 | 7/1993 |
| JP | 6-331977 | 12/1994 |
| JP | 6-347777 | 12/1994 |
| JP | 7-104303 | 4/1995 |
| JP | 8-271919 | 10/1996 |
| JP | 9-160042 | 6/1997 |
| JP | 10-26766 | 1/1998 |

* cited by examiner

— 460nm, 3.8um
--- 550nm, 4.5um
------ 610nm, 5.0um

ACTIVE MATRIX LIQUID CRYSTAL DISPLAY PANEL

This is a divisional of application Ser. No. 08/960,224 filed Oct. 29, 1997 now U.S. Pat. No. 6,842,207; the disclosure of which is incorporated herein by reference.

BACKGROUND OF THE INVENTION

1. Field of the Invention

This invention relates to an active matrix liquid crystal display panel of the structure wherein liquid crystal is held between transparent insulating substrates.

2. Description of the Related Art

An active matrix liquid crystal display panel (hereinafter referred to as AMLCD) wherein a thin film field effect transistor (hereinafter referred to as TFT) is used as a switching element for a pixel has a high picture quality and is utilized widely as a display device for a portable computer or a monitor for a desk top computer of the space saving type.

In recent years, in order to achieve a high quality of a liquid crystal display, a display method called in-plane switching mode which makes use of a transverse electric field in order to improve the visibility angle characteristic has been proposed (for example, Asia Display '95) (Prior Art 1).

According to the display method, a pixel electrode and an opposing electrode are formed in parallel to each other, and a voltage is applied between the pixel electrode and the opposing electrode to form a parallel electric field in a plane of a liquid crystal layer to vary the direction of the director of the liquid crystal thereby to control the amount of transmission light therethrough.

In the liquid crystal display system described above, since the director moves only in a direction substantially parallel to and in the plane of the liquid crystal layer, such a problem that, as the director rises out of the plane of the liquid crystal layer as in the TN (Twisted Nematic) mode, the relationship between the transmission light amount and the applied voltage exhibits a large difference whether the liquid crystal layer is viewed from the direction of the director or from the direction of a normal to the liquid crystal layer does not occur, and a display image which looks in a similar manner from whichever direction it is viewed can be obtained over a very wide visual angle.

FIG. 1 is a view showing a liquid crystal display system which is driven by a transverse electric field and exhibits a good display characteristic.

For the display system described above, several systems have been proposed depending upon the initial orientation condition of the liquid crystal layer and the manner of setting of polarizing plates. Of those systems, such a system as shown in FIG. 1 wherein a liquid layer is injected in the same direction on both substrates and, in the initial orientation condition, the directors are oriented uniformly in this direction while one of two polarizing plates between which the substrates are held and which form a cross nicol is oriented to the direction of the directors in the initial condition so that, when no voltage is applied, a black display is obtained, but when a voltage is applied, the directions of the directors are turned to obtain a white display, is considered advantageous in that the black level can stable be made low.

In the display mode of the display system described above, the transmission factor T of light coming in from the front is given in accordance with the turning angle φ of the directors based on the following expression:

$$T=\sin^2(2\Phi)\cdot\sin^2(\pi\cdot\Delta n d_{eff}/\lambda) \qquad (1)$$

where $d_{eff}$ is the effective value of the liquid crystal layer thickness which undergoes turning deformation when the liquid crystal directors are twist deformed while they are large at a central portion and are fixed at interfaces of the liquid crystal with the substrates, and is smaller than the actual liquid crystal layer thickness.

It has been experimentally confirmed that, for example, where a liquid crystal cell of 4.51 μm thick is formed and liquid crystal having a dielectric constant anisotropy Δn=0.067 is injected in the liquid crystal cell, if a transverse electric field is applied so as to induce a deformation corresponding to φ=45 degrees, the transmission factor exhibits a wavelength dependency as seen from the expression (1) and has a maximum value substantially at λ=550 nm. Conversely, from this, it is esteemed that $d_{eff}$=4.1 μm using the expression (1), and the transmission factor for any other wavelength substantially coincides with a value obtained by substituting $d_{eff}$=4.1 μm into the expression (1).

In this instance, between the representative wavelength 460 nm selected by a color filter of blue and the representative wavelength 610 nm selected by another color filter of red, the transmission factor given by the expression (1) varies within a range less than 10% the highest value thereof. However, even if a special process is not performed, a significantly coloring image does not look when the liquid crystal cell is viewed from the front. Where a higher color purity is required, transmission lights from the color filters of R, G and B can be balanced well by adjusting the transmission factors of the color filters or the spectrum of back light.

It is examined here that, when a transverse electric field is applied to turn the directors approximately by 45 degrees to provide a white display, a substrate is viewed obliquely from a direction perpendicular to the turned directors.

FIGS. 2(a) and 2(b) are views illustrating transmission of light through liquid crystal when it comes in obliquely, and wherein FIG. 2(a) is a view as viewed from an oblique direction with respect to a substrate and FIG. 2(b) is a view as viewed from a parallel direction to the substrate.

While the transmission factor of light passing obliquely through a liquid crystal cell is not precisely represented by the expression (1), it is essentially same in that the light passes through a cross nicol as a retardation is produced between an ordinary ray and an extraordinary ray when it passes through the liquid crystal. Accordingly, $$f=\sin^2(\pi\cdot\Phi n L/\lambda) \qquad (2)$$

wherein $d_{eff}$ of the second factor of the right side of the expression (1) is replaced with the optical path length L when a ray passes through the effectively turned liquid crystal layer, makes an important factor which dominates the intensity of the transmission light.

When the liquid crystal cell is viewed from the front, with green light corresponding to λ=550 nm, the transmission factor spectrum has a maximum value, and consequently, $$\pi\cdot\Delta n d_{eff}/\lambda=\pi/2 \qquad (3)$$

and the factor f in expression (2) is 1.

As seen from FIGS. 2(a) and 2(b), when the liquid crystal cell is viewed from a direction which is perpendicular to the directors and oblique to the substrate, the refractive index anisotropy Δn felt with transmission light is the difference in length between the major axis and the minor axis of an ellipse which corresponds to a section of a refractive index ellipsoid of revolution having a major axis in the direction of the directors of the liquid crystal when the refractive index ellipsoid of revolution is cut along a wave front of the ray. In this instance, since the wave front includes the major axis of the ellipsoid of revolution, the refractive index anisotropy Δn felt with the light is fixed irrespective of the inclination angle θ from the direction of a normal to the substrate. Accordingly, as the inclination angle θ increases, $\pi \cdot \Delta nL/\lambda$ gradually increases from $\pi/2$, while the factor f given by the expression (2) decreases and, reflecting this, also the transmission factor T decreases.

With light of red corresponding to λ=610 nm, $$\pi \cdot \Delta n d_{eff}/\lambda < \pi/2 \quad (4)$$

on the front, and the factor f is smaller than 1. From the same reason as in the case of λ=550 nm, as θ increases, $\pi \cdot \Delta nL/\lambda$ increases, and after it becomes equal to $\pi/2$, it further increases exceeding $\pi/2$. In response to the increase, also the factor f becomes equal to 1 once, and thereafter decrease gradually.

Consequently, also the transmission factor T reflects this and increases once and then decreases gradually.

On the other hand, with light of blue corresponding to λ=460 nm, $$\pi \cdot \Delta n d_{eff}/\lambda > \pi/2 \quad (5)$$

on the front, and the factor f is smaller than 1. From the same reason as in the case of λ=550 nm, as θ increases, $\pi \cdot \Delta nL/\lambda$ increases and is spaced farther from $\pi/2$. Consequently, f decreases farther from 1. Since the rate of increase of f when the optical path length L increases is given by $$\delta f/\delta L = (\pi \cdot \Delta n/\lambda) \cdot \sin(2\pi \cdot \Delta nL/\lambda) \quad (6)$$

as $\pi \cdot \Delta nL/\lambda$ increases exceeding $\pi/2$, f decreases suddenly. Accordingly, it can be said that the decrease of f where λ=460 nm is more sudden than that when λ=550 nm, and also the transmission factor T decreases suddenly.

From the foregoing, since, as θ increases, blue light decreases most suddenly and green light decreases comparatively moderately whereas red light first increases and then decreases, although white light looks on the front, as θ increases, the light gradually appears coloring with red.

This can be confirmed more quantitatively by a simulation which is performed taking a deformation and an optical anisotropy of liquid crystal into consideration.

FIG. 3 is a diagram illustrating a relationship between the inclination angle and the transmission factor when, in order to display white, light comes into a substrate from a direction perpendicular to the liquid crystal directors and oblique to the substrate. It is to be noted that the axis of abscissa indicates the inclination angle θ and the axis of ordinate indicates a result of calculation of the transmission factor normalized with the transmission factor on the front.

As seen from FIG. 3, as θ increases, the transmission factor generally decreases, and above all, it can be seen that the transmission factor for blue decreases most rapidly.

FIG. 4 is a diagram illustrating a relationship between the inclination angle and the transmission factor when, in order to display white, light comes into a substrate from a direction same as the direction of the liquid crystal directors and oblique to the substrate.

As seen in FIG. 4, when the line of sight is gradually inclined to the same direction as that of the directors in a white display, if a similar simulation is performed, it can be seen that red light conversely exhibits the most significant attenuation.

The phenomena described above occur quite similarly with an actual color liquid crystal display panel on which color filters are provided. In fact, it has been confirmed that, when a color liquid crystal panel produced in the same conditions as those of the liquid crystal cell described above is viewed from an oblique direction, it looks coloring.

As described above, with an active matrix liquid crystal display apparatus which is constructed using a transverse electric field, although a good display characteristic is obtained over an angle of visibility wider than that of a conventional TN mode, when viewed from an oblique direction, depending upon the direction, a display image looks coloring significantly. If such coloring occurs, then when image data of full colors are to be displayed, the image of the original picture is deteriorated remarkably.

On the other hand, methods of forming, in a liquid crystal display panel having color filters, liquid layers for the colors of the color filters with different layer thicknesses are disclosed in Japanese Patent Laid-Open Application No. Showa 60-159831 (Prior Art 2) and Japanese Patent Laid-Open Application No. Showa 60-159823 (Prior Art 3). The methods propose a display system wherein liquid crystal is held between two glass substrates and a voltage is applied between transparent electrodes on the opposite sides of the liquid crystal to vary the alignment of the liquid crystal layer, above all, of a liquid crystal display apparatus of the twisted nematic (TN) mode, and besides relates to a method of optimizing the characteristic when the liquid crystal display apparatus is viewed from the front. Those methods are quite different in structure, purpose and principle from the present invention which has been made to suppress coloring which occurs upon oblique light incidence in a transverse electric field display system which has a picture quality much higher than that of the TN system as hereinafter described.

Different methods are proposed in Japanese Patent Laid-Open Application No. Heisei 1-277283 (Prior Art 4) and Japanese Patent Laid-Open Application No. Heisei 6-34777 (Prior Art 5) wherein the thickness of a liquid crystal layer is optimized for individual colors in order to improve the characteristic on the front in simple matrix driving. Similarly, however, the methods are essentially different from the present invention.

Further different techniques are proposed in Japanese Patent Laid-Open Application No. Showa 60-159827 (Prior Art 6), Japanese Patent Laid-Open Application No. Heisei 2-211423 (Prior Art 7) and Japanese Patent Laid-Open Application No. Heisei 7-104303 (Prior Art 8) wherein liquid crystal layers are formed with different thicknesses for the colors of color filters. However, they relate to a structure and a production method proposed to optimize the front characteristic of the TN mode and are essentially different from the present invention.

As described above, with an active matrix liquid crystal display apparatus which is constructed using a transverse electric field, while a good display characteristic is obtained over a wider angle of visibility than that of the conventional TN system, there is a problem in that, when viewed from an oblique direction, significant coloring appears depending upon the direction, and consequently, when image data such as, for example, a photograph are to be handled, the image of the original picture is deteriorated very much.

Again, in recent years, in order to achieve a higher quality of a liquid display, a displaying method called in-plane switching mode (hereinafter referred to simply as "IPS") which makes use of a transverse electric field in order to improve the visibility angle characteristic has been proposed. An example was published in "Asia Display '95" held in Oct. 10 to 18, 1995 and is disclosed in "Principles and Characteristics of Electro-Optical Behaviourwith In-Plane SwitchingMode", a Collection of Drafts for the Asia Display '95. The liquid crystal panel disclosed is constructed such that, as shown in FIG. 5, a linear pixel electrode 71 and a linear opposing electrode 72 are formed in parallel to each other on one of a pair of substrates 70 between which a liquid crystal layer is held, but no electrode is formed on the other substrate. A pair of polarizing plates 73 and 74 are formed on the outer sides of the substrates 70 and have polarization axes 75 and 76 extending perpendicularly to each other. In other words, the polarizing plates 73 and 74 have a positional relationship of a cross nicol to each other. A voltage is applied between the pixel electrode 71 and the opposing electrode 72 to produce a transverse electric field 77 parallel to the plane of the liquid crystal layer, whereupon the directions of the directors of liquid crystal molecules are varied from an initial orientation direction 78 thereby to control transmission light through the liquid crystal layer.

In the twisted nematic mode (hereinafter referred to simply as "TN"), since liquid crystal molecules rise three-dimensionally from the plane of the liquid crystal layer, the manner in which the liquid crystal layer looks is different whether it is viewed in a direction parallel to the directors of rising liquid crystal molecules or in another direction normal to the liquid crystal layer. Further, there is a problem in that, when the liquid crystal display panel is viewed from an oblique direction, the relationship between the applied voltage and the transmission light amount is different very much. More particularly, as seen from a voltage-transmission factor characteristic illustrated as an example in FIG. 6, where a liquid crystal display panel of the TN mode is viewed from the front, the characteristic makes a monotonously decreasing curve wherein the transmission factor decreases as the applied voltage increases after it exceeds 2 V. However, where the liquid crystal display panel of the TN mode is viewed from an oblique direction, the characteristic makes such a complicated curve having external values that, as the applied voltage increases, the transmission factor decreases once until it comes to 0 at the voltage of 2 V, but as the voltage thereafter increases, the transmission factor increases until it decreases again after the voltage exceeds approximately 3 V. Accordingly, if the driving voltage is set based on the voltage-transmission factor characteristic when the liquid crystal display panel is viewed from the front, then when the liquid crystal display panel is viewed from an oblique direction, there is the possibility that gradation reversal may occur such that a white displaying portion looks black or a black displaying portion becomes whitish. After all, normally the display of the liquid crystal display panel of the TN mode is visually observed correctly and can be used only within the range of the angle of visibility of 40 degrees in the leftward and rightward directions, 15 degrees in the upward direction and 5 degrees in the downward direction. Naturally, the upward, downward, leftward and rightward directions can be modified by the installation of the liquid crystal display panel.

On the other hand, the in-plane switch (IPS) system is advantageous in that, since liquid crystal molecules move only in directions substantially parallel to the plane of the liquid crystal layer (two-dimensionally), a substantially similar image can be obtained as viewed from an angle of visibility wider than that of the TN system. Particularly, the IPS system can be used within the range of an angle of visibility of 40 degrees in the upward, downward, leftward and rightward directions.

As apparatus of the IPS system, various liquid crystal display panels have been proposed which have various constructions depending upon the initial orientation condition of the liquid crystal layer and the manner of setting of polarizing plates. In the example of FIG. 5 described above, the liquid crystal layer is processed by interface orientation processing in the same direction for the two substrates and the polarization axis of one of the two polarizing plates extends in parallel to the orientation direction. This liquid crystal display panel allows a stabilized black display since, in the initial orientation condition, the directors of liquid crystal molecules are oriented uniformly in the direction of the interface orientation processing and black is displayed when no voltage is applied, but when a voltage is applied, the directors are turned so that white is displayed.

As described above, with an active matrix liquid crystal display panel of the IPS system which makes use of a transverse electric field, a good display characteristic can be obtained over an angle of visibility wider than that of the conventional TN system. However, also the active matrix liquid crystal display panel of the IPS sometimes suffers from gradation reversal depending upon the angle at which the active matrix liquid crystal display panel is viewed. Where gradation reversal occurs in this manner, there is a problem that, if an image principally of a black color such as hair of a human being is displayed, then a good image cannot be obtained when it is viewed from an oblique direction to the active matrix liquid crystal display panel.

This problem is described in more detail below. First, the transmission factor where the liquid crystal layer is omitted and only two polarizing plates are disposed in a positional relationship of a cross nicol to each other. It is to be noted that, of the two polarizing plates, that one which is disposed on the light incoming side is a polarizer, and the other one which is disposed on the light outgoing side is an analyzer.

In FIG. 7, the unit vector in the absorption axis direction of the polarizer is represented by $e_1$, the unit vector in the absorption axis direction of the analyzer by $e_2$, and the unit vector in the substrate normal direction by $e_3$. Those unit vectors extend perpendicularly to each other. The unit vector in the direction of a ray when it passes through the polarizer is represented by k. Where the angle between the vector k and the substrate normal line is represented by a zenithal angle $\alpha$ and the angle between a projection of the vector k on the plane of a substrate and the vector $e_1$ is represented by an azimuth $\phi$, the vector k is represented as $$k = \sin\alpha\cos\phi \cdot e_1 + \sin\alpha\sin\phi \cdot e_2 + \cos\alpha \cdot e_3 \qquad (7)$$

Light when it passes through the polarizer can be considered to be composed of a polarized light component of the $(e_1 \times k)$ direction and another polarized light component of the $((e_1 \times k) \times k)$ direction. It is to be noted that the symbol "x" between vectors represents the product of the vectors. Since the former is normal to the absorption axis $e_1$, theoretically it is not absorbed. On the other hand, the latter is absorbed by the polarizer. If the product of the absorption coefficient and the film thickness of the polarizer is sufficiently large, then the latter polarized light component is 0 after the light passes through the polarizer.

The refractive indices of the two polarizing plates (polarizer and analyzer) are substantially equal to each other and the directions of the ray when it passes through the analyzer is equal to k, when the ray passes through the analyzer, the light is separated into a polarized light component of the $(e_2 \times k)$ direction and another polarized light component of the $((e_2 \times k) \times k)$ direction. The latter polarized light component is absorbed substantially completely during passage through the analyzer while only the former polarized light component remains. Accordingly, if the influence of reflection at the surface of the glass and so forth is ignored, then the transmission factor T is represented as $$T = \left\{ \frac{1}{\sqrt{2}} \cdot \frac{e_1 \times k}{|e_1 \times k|} \cdot \frac{e_2 \times k}{|e_2 \times k|} \right\}^2 \quad (8)$$

By representing the expression (8) using $\alpha$ and $\phi$, $$T = \frac{1}{2} \cdot \frac{\sin^4\alpha \cdot \sin^2\phi \cdot \cos^2\phi}{\sin^4\alpha \cdot \sin^2\phi \cdot \cos^2\phi + \cos^2\alpha} \quad (9)$$

is obtained.

When light comes in from an azimuth equal to the direction of the absorption axis of one of the polarizing plates such as where the azimuth $\phi$ is 0 degree or 90 degrees, the transmission factor T is 0 from the expression (8). In other words, similarly to the case wherein light comes in from the front, the light does not pass due to the action of the polarizing plates which are at the positions of a cross nicol.

On the other hand, where the azimuth $\phi$=45 degrees, that is, where the azimuth $\phi$ defines 45 degrees with respect to each of the absorption axes of the two polarizing plates, as the zenithal angle $\alpha$ increases, the transmission factor increases. Where the refractive index of the polarizer is 1.5, since the refractive index of the air is approximately equal to 1, the highest value of sin $\alpha$ is approximately 1/1.5. If this is substituted into the expression (9) to calculate it, the resulting transmission factor is approximately 7%. Actually, however, since reflection occurs at the interface between each of the polarizing plates and the air due to the difference in refractive index between them, if a simulation is performed taking the reflection into consideration, then the relationship between the inclination angle (zenithal angle) $\alpha$ of the ray in the air with respect to a normal to the substrate and the transmission factor is such as indicated by a curve 1 of FIG. 8.

Next, another case is described wherein liquid crystal having a positive dielectric constant anisotropy and having a refractive index anisotropy with $n_o$=1.45 and $\Delta n$=0.067 is held between two polarizing plates such that the directors are oriented in the same direction ($\alpha$=90 degrees and $\phi$=0 degree) as that of the absorption axis of the analyzer. Light having passed through the polarizer advances, in the liquid crystal, in a direction a little different from the direction of the light in the polarizer. As a result, the linearly polarized light polarized uniformly when it passes through the polarizer becomes elliptically polarized light after it passes through the liquid crystal. Consequently, the transmission factor is different from that where the liquid crystal is absent. The relationship between the zenithal angle $\alpha$ and the transmission factor when light comes in from the direction of the azimuth $\phi$=45 degrees is indicated by a curve 2 in FIG. 8. In this instance, the transmission factor is rather higher than that (curve 1) where only the polarizing plates of a cross nicol are arranged while no liquid crystal layer is present.

On each substrate interface, the liquid crystal directors do not extend completely parallel to the plane of the substrate but normally rise by approximately 1 to 10 degrees with respect to the plane of the substrate. This angle is a pretilt angle. Usually, since, in order to orient liquid crystal with a higher degree of stability, interface orientation processing such as rubbing is performed such that the orientation directions of liquid crystal molecules may extend in parallel to each other in the proximity of each interface, the liquid crystal molecules are inclined by a fixed angle with respect to the plane of the substrate substantially in all regions. Where an orientation film for industrial use which is high in stability is employed, generally the pretilt angle is approximately 3 degrees.

The relationship between the zenithal angle $\alpha$ and the transmission factor where the pretilt angle is 3 degrees and light comes in from the direction of the azimuth $\phi$=45 degrees is such as indicated by a curve 3 in FIG. 8. Further, the relationship between the zenithal angle $\alpha$ and the transmission factor where the pretilt angle is −3 degrees and light comes in from the direction of the azimuths $\phi$=45 degrees is such as indicated by a curve 4 in FIG. 8. It is to be noted that the pretilt angle when the liquid crystal rises in the same direction as the vector $e_1$ is taken as positive, and the pretilt angle when the liquid crystal rises in the opposite direction to the vector e1 is taken as negative. Particularly where the liquid crystal rises in the same direction as the vector $e_1$ (where the pretilt angle is positive), the transmission factor has a value approximately twice that in the case where only the polarizing plates are present (no liquid crystal is present).

Since the curves 1 to 4 of FIG. 8 exhibit comparison among black display conditions when no electric field is applied to the liquid crystal as described above, preferably the transmission factor is as low as possible. However, the curve 3 has a very high transmission factor comparing with the curves 1, 2 and 4. Therefore, the case of the curve 3, that is, the case wherein the pretilt angle is 3 degrees, is described in more detail.

While description has been given above of the case wherein no electric field is applied to the liquid crystal, if a transverse electric field is applied to the electric field to turn the directors in the plane of the liquid crystal layer, then the transmission factor increases. According to a simulation by calculation, the transmission factor when the potential difference between a pixel electrode and a common electrode is 3 V is approximately 2.4%, and the transmission factor when the potential difference is 3.5 V is approximately 6.3%. FIG. 9 shows graphs obtained by plotting results of calculation of the transmission factor variation when the zenithal angle $\alpha$ is varied while the pretilt angle is 3 degrees and azimuth $\phi$=45 degrees. When no electric field is applied (V=0 V), the graph is same as the curve 3 of FIG. 8 described hereinabove. When an electric field is applied, a result is obtained that, as the zenithal angle $\alpha$ increases, the transmission decreases, and the curve for V=3.0 V crosses in the proximity of the zenithal angle $\alpha$=37 degrees, but the curve for V=3.5 V crosses in the proximity of the zenithal angle $\alpha$=50 degrees, with the curve for V=0 V when no electric field is applied (when the liquid crystal is in the initial orientation condition), and thereafter the transmission factor and the brightness are reversed. In other words, when the potential difference is 3.0 V, where the zenithal angle $\alpha$ is smaller than 37 degrees, the transmission factor is higher where a voltage is applied than where no voltage is applied, but where the zenithal angle $\alpha$ exceeds 37 degrees, the transmission factor is lower where a voltage is applied than where no voltage is applied. Accordingly, where the zenithal angle $\alpha$ exceeds 37 degrees, a voltage applied portion becomes rather black while a no-voltage applied portion becomes rather white, and so-called gradation reversal wherein the black and white displays are reversed to ordinary black and white displays occurs. It is to be noted that, since the transmission factors at a voltage applied portion and a no-voltage applied portion are not much different from each other in the proximity of the zenithal angle $\alpha$=37 degrees, the contrast is small and the display image cannot be observed well. Similarly, where the potential difference is 3.5 V, gradation reversal wherein the transmission factors between a voltage applied portion and a no-voltage applied portion are reversed to each other occurs around the zenithal angle α of 50 degrees.

The phenomenon of gradation reversal described above is observed also with actual devices. Although depending upon the relationship between the pretilt angle of the liquid crystal and the directions of absorption axes of the polarizing plates, depending upon a direction in which the active matrix liquid crystal display panel is viewed, gradation reversal sometimes occurs when the display panel is viewed from an angle of 40 degrees.

In this manner, with the active matrix liquid crystal display apparatus of the IPS system which is constructed using a transverse electric field, while a good display characteristic is obtained over a wider angle of visibility than that of the conventional TN system, there is a problem in that, depending upon a direction in which the display apparatus is viewed, gradation reversal occurs, and particularly where a display which includes much black is viewed from an oblique direction, a good image cannot be obtained.

As described above, when a substrate is viewed obliquely from a direction of, for example, 45 degrees with respect to the polarization axes of two polarizing plates which are in a positional relationship of a cross nicol, a white floating phenomenon occurs because a phenomenon that, at a portion at which no voltage is applied, transmission light from one of the polarizing plates is absorbed but not completely by the other polarizing plate occurs. Further, since liquid crystal having a refractive index anisotropy is held between the two polarizing plates, the degree of the white floating phenomenon of the liquid crystal display panel is not fixed-because light (linearly polarized light) having passed through one of the polarizing plates undergoes double refraction so that it is changed into elliptically polarized light, which enters the other polarizing plate. Where the directors of the liquid crystal on the plane of the substrate are oriented such that projections thereof extend in parallel to the polarization axis of one of the polarizing plates and they define a fixed pretilt angle with respect to the plane of the substrate as in an ordinary liquid crystal display which makes use of a transverse electric field, as seen in FIG. 8, the white floating intensity becomes very high depending upon the rising direction of the liquid crystal. if the white floating is intensified in this manner, then gradation reversal sometimes occurs at a low zenithal angle as seen in FIG. 9.

SUMMARY OF THE INVENTION

The present invention has been made in view of the problems of the prior art described above, and it is a first object of the present invention to provide an active matrix liquid crystal display apparatus of the transverse electric field driven type which has a good display characteristic free from coloring from whichever direction the display apparatus is viewed.

It is a second object of the present invention to provide an active matrix liquid crystal display panel which suppresses rather white coloring of a black display portion without losing a good visibility angle characteristic of a transverse electric field display and has a good display characteristic free from gradation reversal over a larger visibility angle range.

In order to attain the objects described above, according to an aspect of the present invention, there is provided an active matrix liquid crystal display panel, comprising a first substrate on which a plurality of color layers having transmission wavelengths different from each other are provided in parallel to each other, a second substrate disposed in an opposing relationship to the first substrate with a predetermined clearance left from the first substrate for generating a predetermined electric field when a predetermined voltage is applied, and a liquid crystal layer formed from liquid crystal injected in a gap defined by a surface of the first substrate adjacent the second substrate and a surface of the second substrate adjacent the first substrate, the electric field generated by the second substrate being substantially parallel to the liquid crystal layer to control a display, the liquid crystal layer having a thickness which Varies depending upon the transmission wavelengths of the color layers.

The liquid crystal layer may have a thickness which increases in proportion to one wavelength selected from a wavelength region in which transmission factors of the color layers are higher than 70% those at peaks of transmission spectra of the color layers.

The second substrate may include a plurality of pixel electrodes provided corresponding to the color layers, the predetermined voltage being applied to the pixel electrodes, and a plurality of opposing electrodes provided in parallel to the pixel electrodes for each of the color layers for cooperating, when the voltage is applied to the pixel electrodes, with the pixel electrodes to generate the electric field therebetween, the pixel electrodes and the opposing electrodes being spaced from each other by distances which are different for the individual color layers.

The first substrate may have a protective layer provided on a surface thereof adjacent the second substrate for preventing elusion of impurities from the color layers.

The reason why coloring occurs with a liquid crystal display apparatus of the transverse electric field driven type when the liquid crystal display apparatus is viewed from an oblique direction arises from the fact that, when the factor f defined by the expression (2) varies depending upon whether a ray comes in perpendicularly or from an oblique direction, the manner of the variation is varied by λ.

A color liquid crystal display apparatus of a high quality with which such coloring is called in question employs a color filter in almost all cases.

FIG. 14 is a diagram illustrating an example of transmission factor spectrum characteristics of color, filters.

As seen from FIG. 14, the color filters selectively pass certain limited wavelength regions corresponding to the three primary colors of R, G and B therethrough. The peaks of the transmission factor spectra of the color filters illustrated in FIG. 14 are 460 nm for blue, 540 nm for green and 640 nm for red. Further, the wavelength regions having transmission factors higher than 70% those at the peaks are 420 to 500 nm for blue, 510 to 580 nm for green and 590 or more for red. In those wavelength regions, since 70% or more of incoming light passes through the color filters, they have a significant influence on the display characteristic.

Thus, if, taking a radiation spectrum of back light, a spectral luminous efficacy and so forth into consideration, a certain wavelength from within the wavelength regions described above is selected as a representative and examined in regard to the transmission and so forth upon designing, then the values of the transmission factor and so forth for an arbitrary wavelength in the wavelength regions become substantially equal to each other within a range of conversion regarding the transmission factor of the color filter.

Normally, since $\lambda_B=460$ nm, $\lambda_G=550$ nm and $\lambda_R=610$ nm for the blue, green and red color filters, respectively, are positioned substantially at the centers of the respective transmission wavelength regions, they can be selected as the representative values.

Although the following description proceeds using the values mentioned above as representative values, the specific values need not necessarily be used as the representative values.

First, for the selected wavelengths $\lambda_R$, $\lambda_G$ and $\lambda_B$, the thicknesses of the liquid crystal layer of pixels corresponding to the color filters are determined so as to satisfy $$d_R/\lambda_R = d_G/\lambda_G = d_B/\lambda_B \tag{10}$$

In this instance, the f factors of R, G and B when light comes in from the front are given by $$f_R = \sin^2(\pi \cdot \Delta n d R_{eff}/\lambda_R) \tag{11}$$

$$f_G = \sin^2(\pi \cdot \Delta n d R_{eff}/\lambda_G) \tag{12}$$

$$f_B = \sin^2(\pi \cdot \Delta n d R_{eff}/\lambda_B) \tag{13}$$

where the effective thicknesses $d_{Reff}$, $d_{Geff}$ and $d_{Beff}$ of the liquid crystal layer turned by the transverse electric field and the cell gaps $d_R$, $d_G$ and $d_B$ have a relationship given by the following expression:

$$d_{Reff}/d_R = d_{Geff}/d_G = d_{Beff}/d_B \tag{14}$$

Using the expressions (10) to (14), $$f_R = f_G = f_B \tag{15}$$

is obtained.

On the other hand, if a substrate is viewed, in a white display condition, obliquely from a direction perpendicular to the directors as seen in FIG. 2, then the refractive index anisotropies Δn felt with the ray do not vary, but only the optical path lengths L increase in accordance with the following expressions:

$$L_R = d_{Reff}/\cos(\theta') \tag{16}$$

$$L_G = d_{Geff}/\cos(\theta') \tag{17}$$

$$L_B = d_{Beff}/\cos(\theta') \tag{18}$$

where θ' is the angle defined between the direction in which the light advances in the liquid crystal and a substrate normal, and strictly speaking, it is different for the individual colors where the refractive index has a wavelength dependency. However, since this wavelength dependency is very small, it may be handled as being substantially fixed. Where the f factors when light comes in obliquely are represented by $f'_R$, $f'_G$ and $f'_B$ for R, B and G, respectively, from the definition of f of the expression (2) and the expressions (10), (14), (16), (17) and (18), $$f'_R = f'_G = f'_B \tag{19}$$

is obtained. Accordingly, as the inclination angle θ varies, although the values of the factors f themselves vary, since they have quite same values also for different wavelengths, no coloring occurs.

While description is given above of the case wherein the direction in which a substrate is viewed is inclined to a direction perpendicular to the directors of the liquid crystal, since the ratio between the optical path length and the wavelength is fixed in any other direction irrespective of the wavelength, the expression (19) stands in whichever direction the substrate is viewed and no coloring occurs.

This fact can be confirmed quantitatively by a simulation.

FIG. 15 is a diagram illustrating a relationship between the inclination angle and the transmission factor in the active matrix liquid crystal display apparatus of the present invention when light comes in, upon displaying of white, in a direction perpendicular to the liquid crystal directors but oblique to the substrate, and FIG. 16 is a diagram illustrating a relationship between the inclination angle and the transmission factor in the active matrix liquid crystal display apparatus of the present invention when light comes in, upon displaying of white, in a direction same as the liquid crystal directors but oblique to the substrate. It is to be noted that, in FIGS. 15 and 16, assuming a case wherein white is displayed on a liquid crystal display apparatus wherein the thickness of the liquid crystal layer is varied for the individual colors of the color filters, the relationship between the inclination angle θ of the ray and the transmission factor is obtained by calculation with lights having wavelengths of 610 nm, 550 nm and 460 nm representing the color filters of R, G and B (Red, Green and Blue), and the axis of abscissa represents the inclination angle of the incoming ray from the substrate normal and the axis of ordinate represents the transmission factor normalized with the front transmission factor. Here, the thicknesses of the liquid layer corresponding to R, G and B are 5.0 μm, 4.5 μm and 3.8 μm, respectively, while the intensity of the transverse electric field to be applied is set so as to increase in inverse proportion to the thickness of the liquid crystal layer so that the turning angles of the liquid crystal layer by the transverse electric field may be equal for R, G and B.

The azimuth in which the ray is inclined was taken, in FIG. 15, to a direction perpendicular to the turned liquid crystal directors, but taken, in FIG. 16, to the same direction as the turned liquid crystal directors.

As apparently seen from FIGS. 15 and 16, as the inclination angle θ varies, the transmission factors vary, but they exhibit a same behavior for the wavelengths which represent the respective color filters. Accordingly, it was confirmed successfully also by the simulation that no coloring occurs at all.

When the thickness of the liquid crystal layer is varied for the individual colors of the corresponding color filters, the intensity of the transverse electric field necessary to turn the directors of the liquid crystal by a certain fixed angle increases in inverse proportion to the thickness of the liquid crystal layer. Accordingly, the intensities of the transverse electric fields to be applied in order to obtain a white display make the ration of 3.8:4.5:5.0 for R, G and B. Therefore, when the distance between a pixel electrode and an opposing electrode was set to 10 μm, the potential difference between the pixel electrode and the opposing electrode in order to effect white display was 5.5 V for red, 6.0 V for green and 7.0 V for blue.

A system which provides voltages different for the individual colors in this manner increases in complexity of circuitry and invites an increase in cost for a driving system. Therefore, the distance between a pixel electrode and an opposing electrode is made different for the individual colors such that it is 11 μm for red, 10 μm for green and 8.5 μm for blue so that a good white display can be obtained by applying 6 V uniformly to pixels corresponding to all of the colors.

According to another aspect of the present invention, there is provided an active matrix liquid crystal display panel, comprising a plurality of scanning lines and a plurality of signal lines disposed in an intersecting relationship with each other like gratings on one of a pair of transparent insulating substrates, a plurality of active elements individually provided in the proximity of intersecting points of the scanning lines and the signal lines, a plurality of pixel electrodes connected to the active elements, a plurality of opposing electrodes disposed corresponding to the pixel electrodes, a voltage being applied between the pixel electrodes and the opposing electrodes, a liquid crystal layer disposed between the one transparent insulating substrate and the other transparent insulating substrate, a pair of polarizing plates disposed on the outer sides of the transparent insulating substrates, and a mechanism for controlling a display with an electric field substantially parallel to the liquid crystal layer, and an optical compensation layer having a negative refractive index anisotropy in a one axis direction, a projection of the anisotropic axis of the optical compensation layer on a plane of one of the substrates being parallel to at least one of polarization axes of the two polarizing plates, the optical compensation layer being disposed at least between the one transparent insulating substrate and a corresponding one of the polarizing plates.

Where the active matrix liquid crystal display panel is constructed such that, when the voltage between the pixel electrodes and the opposing electrodes is 0, angles formed by directors of liquid crystal molecules in the liquid crystal layer with respect to a plane of the liquid crystal layer are substantially uniform, and the refractive index anisotropic axis of the optical compensation layer extends substantially in parallel to the directors, the accuracy in compensation by the optical compensation layer is improved.

Where a product $\Delta n_{LC} \cdot d_{LC}$ of a refractive index anisotropy $\Delta n_{LC}$ and a layer thickness $d_{LC}$ of the liquid crystal layer is substantially equal to a product $\Delta n_F \cdot d_F$ of the refractive index anisotropy $\Delta n_F$ and a layer thickness $d_F$ of the optical compensation layer, the compensation accuracy can be further improved.

Where a refractive index $n_{LO}$ of the liquid crystal layer for ordinary light and a refractive index $n_{FO}$ of the optical compensation layer for ordinary light are substantially equal to each other, the degree of compensation can be further improved.

Preferably, the active matrix liquid crystal display panel is constructed such that, when a potential difference between the pixel electrodes and the opposing electrodes is 0, projections of directors of liquid crystal molecules in the liquid crystal layer on a plane of the liquid crystal layer are substantially parallel to each other and a projection of the refractive index anisotropic axis of the optical compensation layer on the plane of the liquid crystal layer is parallel to the projections of the directors on the plane of the liquid crystal layer, and, where an angle of the refractive index anisotropic axis of the optical compensation layer with respect to the plane of the liquid crystal layer is represented by $\theta_F$ and angles between the directors and the plane of the liquid crystal layer on interfaces between the liquid crystal layer and the insulating substrates are represented by $\theta_1$ and $\theta_2$, $\theta_1$ and $\theta_2$ being different from each other, the angle $\theta_F$ satisfies $\theta_1 < \theta_F < \theta_2$ or $\theta_2 < \theta_F < \theta_1$, and the refractive index anisotropic axis of the optical compensation layer is parallel to the director of at least one of the liquid crystal molecules in the liquid crystal layer.

Further preferably, the active matrix liquid crystal display panel is constructed such that, when a potential difference between the pixel electrodes and the opposing electrodes is 0, projections of directors of liquid crystal molecules in the liquid crystal layer on a plane of the liquid crystal layer are substantially parallel to each other and a projection of the refractive index anisotropic axis of the optical compensation layer on the plane of the liquid crystal layer is parallel to the projections of the directors on the plane of the liquid crystal layer, and, where an angle of the refractive index anisotropic axis of the optical compensation layer with respect to the plane of the liquid crystal layer is represented by $\theta_F$ and angles between the directors and the plane of the liquid crystal layer on interfaces between the liquid crystal layer and the insulating substrates are represented by $\theta_1$ and $\theta_2$, $\theta_1$ and $\theta_2$ being different from each other, the angle $\theta_F$ always satisfies $\theta_1 < \theta_F < \theta_2$ or $\theta_2 < \theta_F < \theta_1$, and the angle $\theta_F$ varies in a thicknesswise direction of the optical compensation layer in a corresponding relationship to a variation of the director in the thicknesswise direction of the liquid crystal layer.

BRIEF DESCRIPTION OF THE DRAWINGS

FIGS. 2(a) and 2(b) are diagrammatic views illustrating passage of light through liquid crystal when the light comes in obliquely, and wherein FIG. 2(a) is a view as viewed from an oblique direction to a substrate and FIG. 2(b) is a view as viewed in a direction parallel to the substrate;

FIGS. 12(a) to 12(d) are views illustrating a method of controlling the liquid crystal layer thickness, and wherein FIG. 12(a) is a sectional view of a color filter provided with a spacer, FIG. 12(b) is a view showing the color filter combined with an active matrix substrate, FIG. 12(c) is a sectional view where an overcoat layer is provided, and FIG. 12(d) is a view where a granular spacer is provided;

DETAILED DESCRIPTION OF THE PREFERRED EMBODIMENTS (First Embodiment)

Figure 11A:
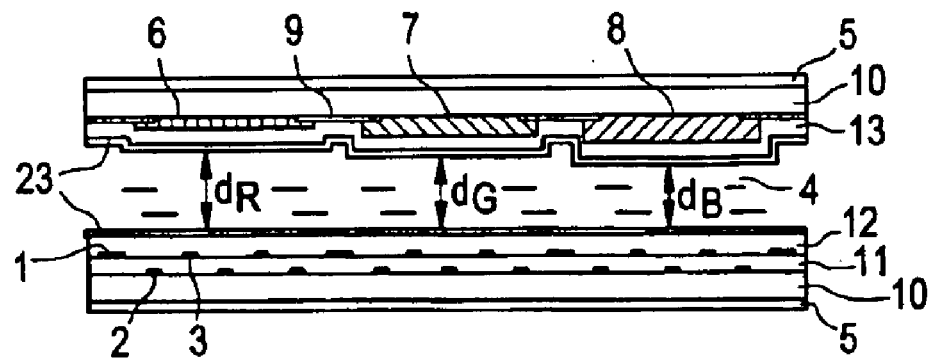
FIGS. 11(a) and 11(b) are a sectional view and a plan view, respectively, showing a first embodiment of the active matrix liquid crystal display apparatus of the present invention.

The first embodiment is described with reference to FIGS. 11(a) and 11(b). Each pixel electrode 3 which forms a pixel is connected to the source electrode of a thin film transistor which has a scanning line 16 as a gate electrode thereof, and the drain electrode of the thin film transistor is connected to a signal line 1. The pixel electrode 3 has a longitudinal direction parallel to the signal line 1 and has an opposing electrode 2 connected by an opposing electrode bus line 17.

Figure 11B:
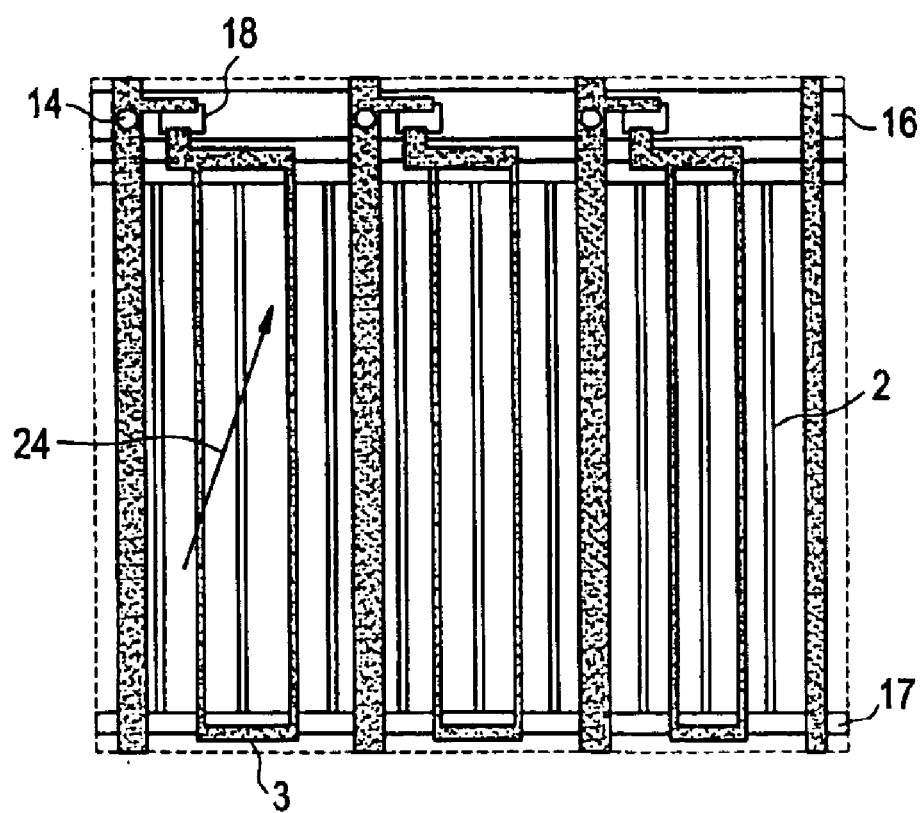

A liquid crystal layer 4 is held between two glass substrates 10, and orientation films 23 are disposed on two substrate interfaces and are oriented uniformly in a rubbing direction 24 of FIG. 11(b) by rubbing them in the same direction.

A pair of polarizing plates 5 disposed on the outer sides of the two glass substrates 10 have polarization axes perpendicular to each other, and the polarization axis of one of the polarizing plates 5 coincides with the initial orientation direction of the liquid crystal layer 4.

In the liquid crystal display apparatus of the transverse electric field type having the construction described above, when the potential difference between the pixel electrode 3 and the opposing electrode 2 is 0, black is displayed, and as the potential difference increases, the liquid crystal layer 4 is turned to cause double refraction thereby to raise the transmission factor. When the liquid crystal layer 4 is turned approximately by 45 degrees, the brightness exhibits its highest value.

A color filter is disposed on the opposing substrate and includes color layers 6, 7 and 8 for selectively passing the colors of red, green and blue therethrough, respectively, and a black matrix 9 provided to inhibit leakage of light from any other area than display areas in which effective display control is performed.

For each pixel, the cell thickness of the liquid crystal layer 4 is varied in accordance with the color to be selected by the color filter such that it may be $d_R$ for red, $d_G$ for green and $d_B$ for blue. In this instance, if the wavelength represented by a color of the color filter is se to $\lambda_R$ for red, $\lambda_G$ for green and $\lambda_B$ for blue, then the layer thicknesses of the liquid crystal layer 4 corresponding to the colors are determined so as to satisfy the following expression:

$$d_R/\lambda_R = d_G/\lambda_G = d_B/\lambda_B \tag{20}$$

Figure 12A:
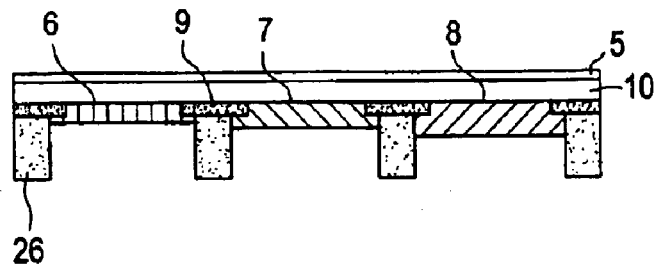
Figure 12B:
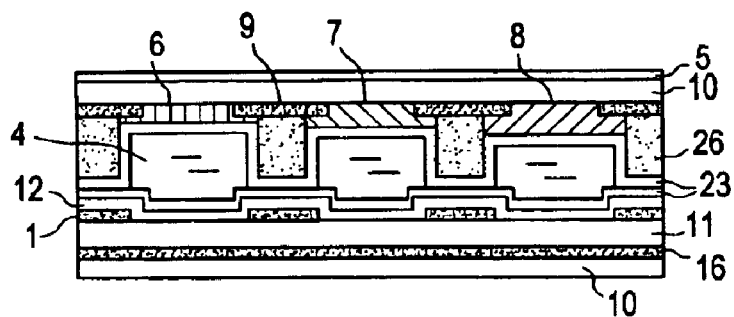

In order to vary the cell thickness of the liquid crystal layer 4 for the individual colors of the color filter in this manner, such a color filter substrate provided with spacers 26 as shown in FIG. 12(a) and a substrate having a TFT array formed thereon were combined in such a manner as seen in FIG. 12(b), and liquid crystal was filled between the two substrates to form the panel. It is to be noted that the spacers 26 are formed on the black matrix 9 on the opposing substrate corresponding to crossing locations between the scanning lines 16 and the signal lines 1. Consequently, in a condition wherein the two substrates are combined in such a manner as shown in FIG. 12(b), the spacers 26 has such spacer contacting portions 14 as shown in FIG. 11(b).

Figure 14:
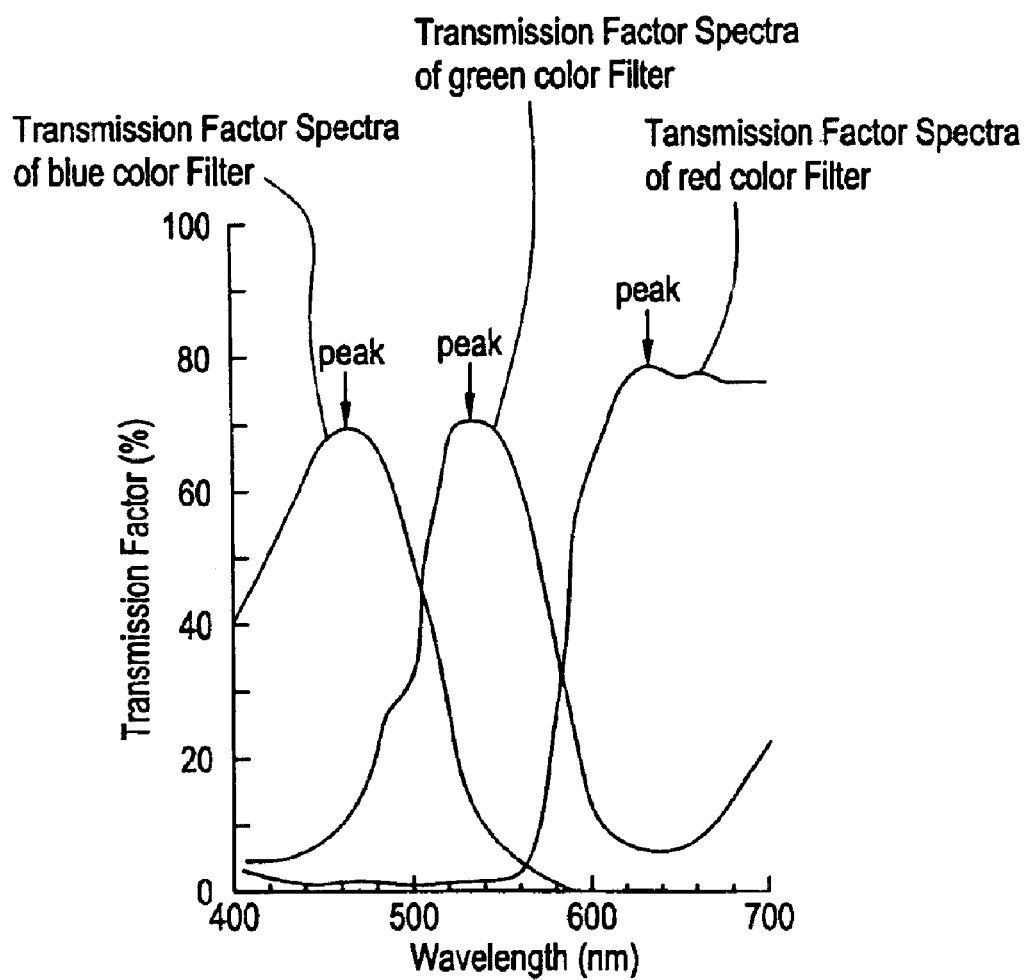
FIG. 14 is a diagram illustrating an example of transmission factor spectrum characteristics of color filters.
Figure 15:
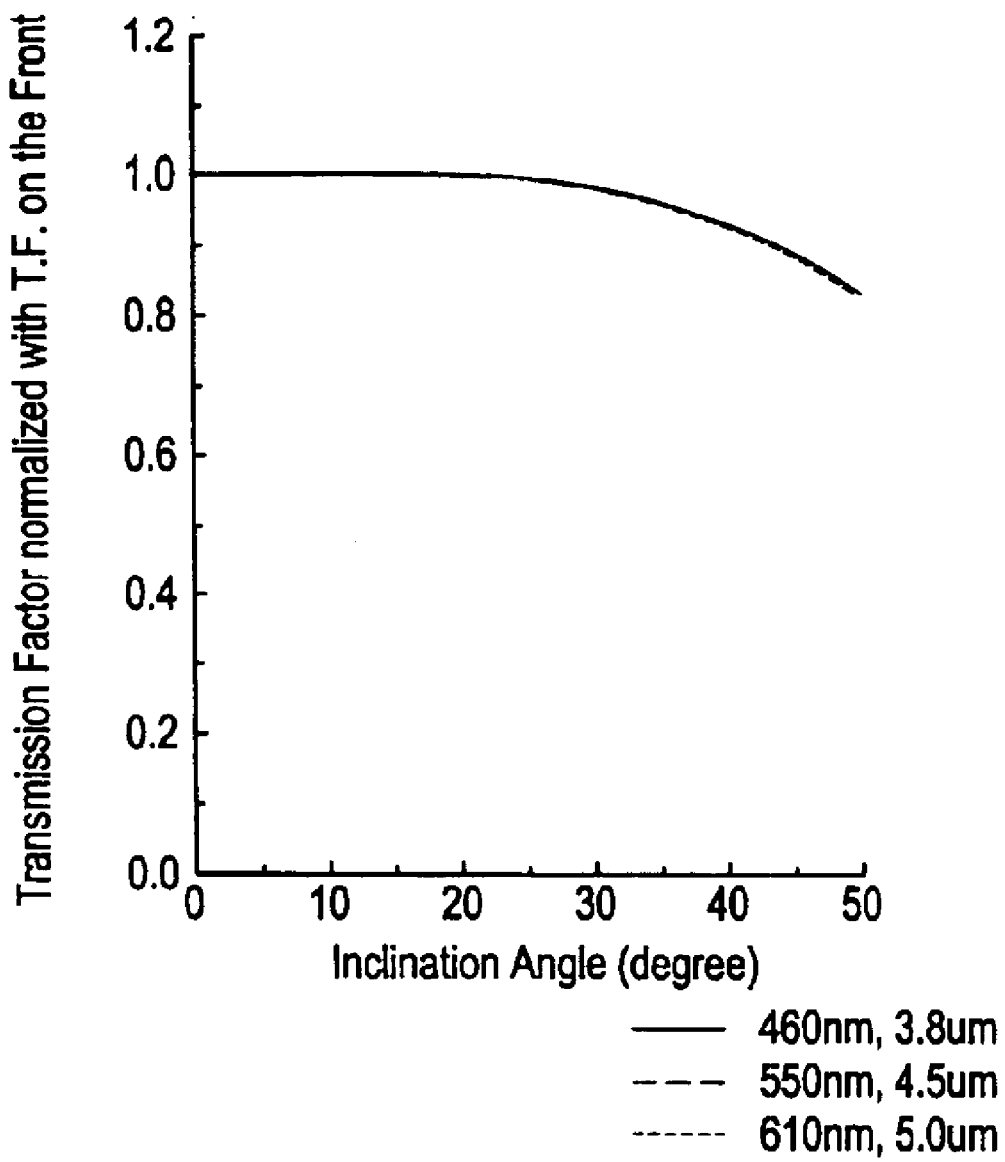
FIG. 15 is a diagram illustrating a relationship between the inclination angle and the transmission factor when light comes into the active matrix liquid crystal display apparatus of the present invention, upon displaying of white, from a direction perpendicular to the liquid crystal directors and oblique to a substrate.
Figure 16:
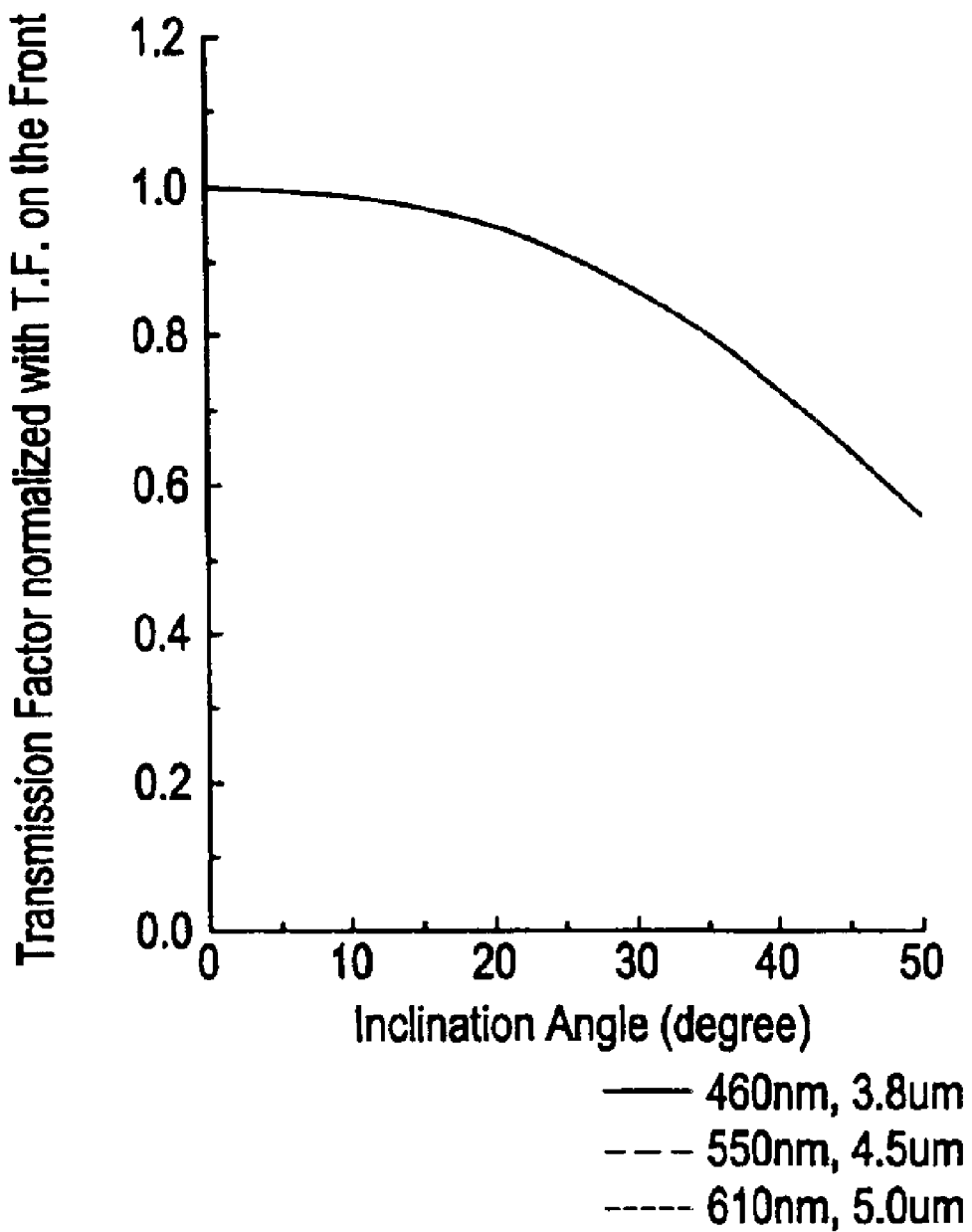
FIG. 16 is a diagram illustrating a relationship between the inclination angle and the transmission factor when light comes into the active matrix liquid crystal display apparatus of the present invention, upon displaying of white, from a direction same as that of the liquid crystal directors and oblique to a substrate.

In the thickness of the liquid crystal layer 4, while the transmission factors for the individual color layers of the color filter are kept equal to those of ordinary color filters which have such transmission factor characteristics as shown in FIG. 14, only the film thicknesses of the color layers were made different so as to satisfy the expression (20). Here, where the height of the spacers 26 is represented by $t_s$, the thickness of the black matrix 9 is represented by $t_M$ and the thicknesses of the scanning lines 16 and the signal lines 1 are represented by $t_v$ and $t_H$, respectively, the film thicknesses $t_R$, $t_G$ and $t_B$ of the color layers of R, G and B were controlled so as to satisfy $$t_s + t_M + t_v + t_H = t_R + d_R = t_G + d_G = t_B + d_B \tag{21}$$

In this instance, the concentration of a pigment to be dispersed into each color layer is adjusted in accordance with the film thickness of the color layer.

Figure 12C:
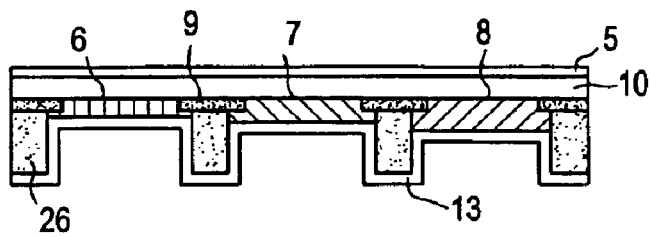

It is also possible to form an overcoat layer on the color filter shown in FIG. 12(a) as seen in FIG. 12(c) in order to prevent elusion of impurities from the color layers.

Figure 12D:
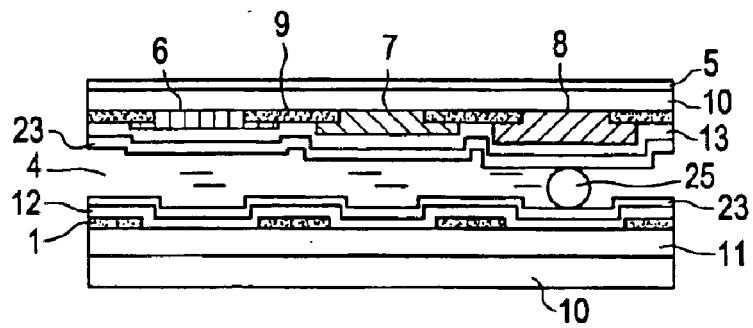

Further, in order to dispose the two substrates parallelly in a spaced relationship by a fixed distance from each other, granular spacers 25 sprayed uniformly as seen in FIG. 12(d) may be used in place of the spacers of the color filter with a spacer.

Further, while, in the present embodiment, the spacers 26 are provided at the crossing points between the scanning lines 16 and the signal lines 1, they need not necessarily be provided at those locations, but if the substrates can be held in a fixedly spaced relationship from each other, the spacers may be provided in any location in pixels. Preferably, however, the spacers 26 are provided at locations which doe not have an influence on a display and at which they are covered with the black matrix 9. In this instance, since the thickness of the liquid crystal layer formed with the spacers 26 is varied a little by the pattern of wiring lines or an insulation film, designing of the height of the spacers 26 based on such variation is required.

(Second Embodiment)

Figure 13A:
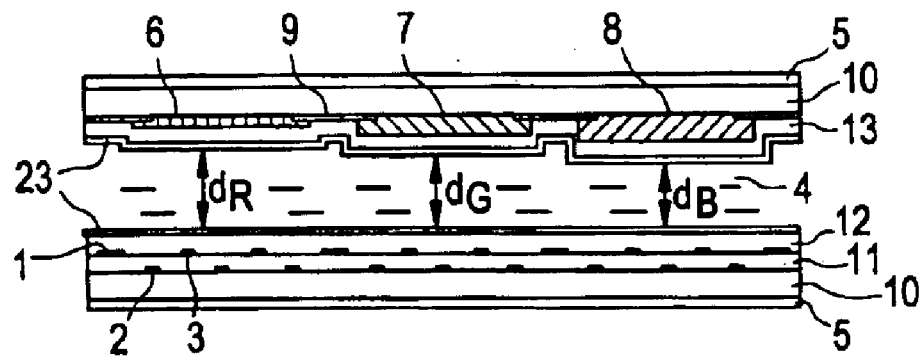
FIGS. 13(a) and 13(b) are a sectional view and a plan view, respectively, showing a second embodiment of the active matrix liquid crystal display apparatus of the present invention.
Figure 13B:
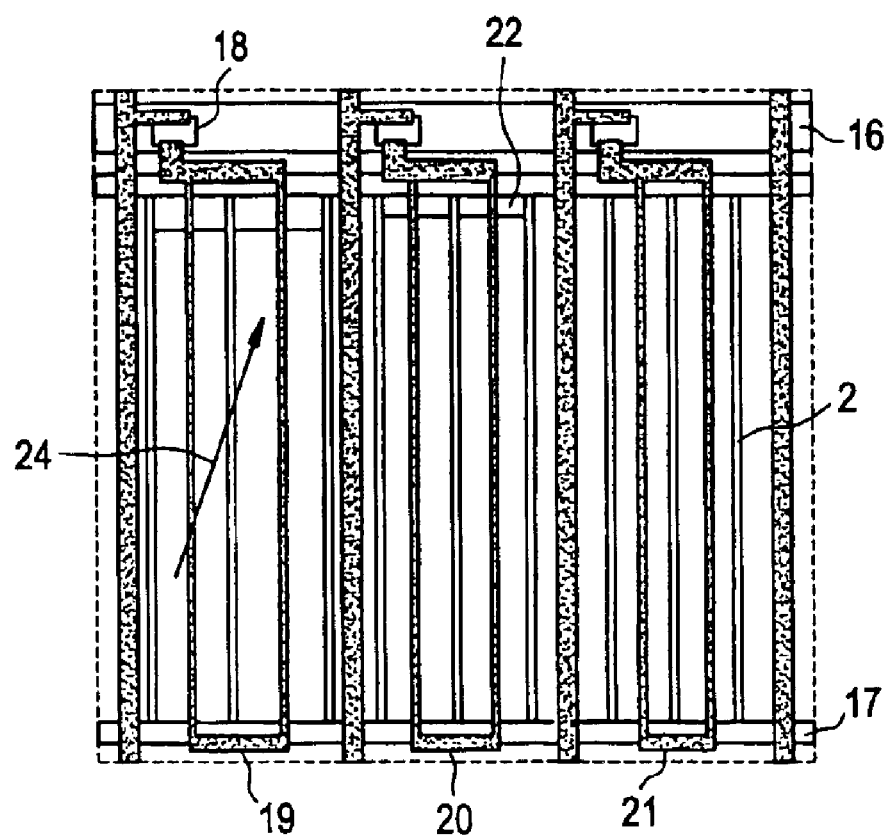

FIGS. 13(a) and 13(b) are a sectional view and a plan view, respectively, showing a second embodiment of the active matrix liquid crystal display apparatus of the present invention.

As shown in FIGS. 13(a) and 13(b), the present embodiment is quite same as the first embodiment except that the distance between a pixel electrode 3 and an opposing electrode 2 is different between a pixel 20 corresponding to green and a pixel 21 corresponding to blue and that numerical aperture adjustment portions 22 are present.

Since the distance between a pixel electrode 3 and an opposing electrode 2 is made different as seen in FIGS. 13(a) and 13(b), it can be realized by applying the same potential that the transverse electric field intensity necessary to turn the liquid crystal layer 4 is different among the different colors, which arises from a variation of the thickness of the liquid crystal layer 4. Consequently, driving is facilitated.

Further, the numerical aperture adjustment portion 22 is provided in order to prevent the ratio of an effective display area held between a pixel electrode 3 and an opposing electrode 2 occupied in one pixel, that is, the numerical aperture, from varying the distance between the pixel electrode 3 and the opposing electrode 2 by an opaque metal layer formed as the same layer as the opposing electrode 2 or the same layer as the pixel electrode 3. Since the distance between a pixel electrode 3 and an opposing electrode 2 is largest with a pixel 19 corresponding to red and decreases in order of green and blue, the area of the numerical aperture adjustment portion 22 is largest with a pixel 19 corresponding to red, but is rather small with another pixel 20 corresponding to green, and no numerical aperture adjustment portion 22 is provided for a pixel 21 corresponding to blue.

The other construction is quite same as that of the first embodiment.

In the following, working examples of the embodiments described above are described in detail using detailed values including a method of producing the same.

First, a method of producing an active matrix substrate which is the second substrate is described.

As a metal layer from which signal lines 1, opposing electrodes 2 and opposing electrode bus lines 17 are to be formed, a Cr film is deposited with 150 nm on a transparent glass substrate 10 and patterned.

Then, as a gate insulating film 11, a silicon nitride film of 400 nm thick, a non-doped amorphous silicon film of 350 nm thick and an n-type amorphous silicon film of 30 nm thick are successively deposited.

Then, an n-type amorphous silicon film and a non-doped amorphous silicon layer are formed in accordance with the pattern of island-shaped amorphous silicon 18.

Then, as a metal layer from which signal lines 1 and pixel electrodes 3 are to be formed, a Cr film is deposited with the thickness of 150 nm and patterned.

Then, a protective insulating film 12 is formed, and the protective insulating film 12 is removed at peripheral terminal locations thereof to complete a TFT array. In this instance, the patterns of the pixel electrodes 3 and the opposing electrodes 2 are formed such that the distances between them may be fixed to 10 $\mu$m with pixels corresponding to all colors as seen in FIGS. 11(a) and 11(b).

Now, a method of producing a color filter substrate as the first substrate is described.

Photosensitive polymer of 0.1 $\mu$m thick containing carbon is formed on a transparent glass substrate and a black matrix layer 9 is provided using a photo-lithography technique.

Then, photosensitive polymer containing a red pigment is formed on the substrate, and the photosensitive polymer formed in a region other than the region in which the red filter is formed is removed by a photo-lithography technique to form the red filter 6.

Then, similar steps are performed to successively form the green filter 7 and the blue filter 8.

The color filter produced in this manner had such transmission factor spectra as illustrated in FIG. 14.

Next, a method of forming the spacers is described.

Figure 17:
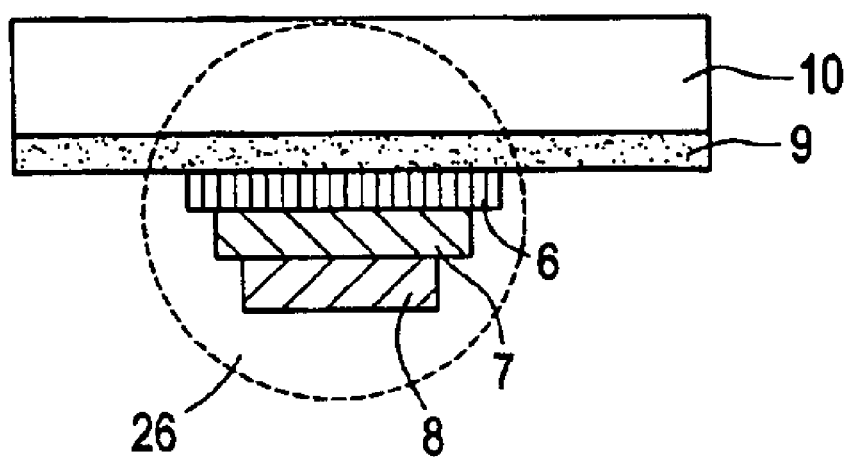
FIG. 17 is a view showing an example of a construction of a spacer provided in the active matrix liquid crystal display apparatus of the present invention.

FIG. 17 is a view showing an example of a construction of the spacers provided in the active matrix liquid crystal display apparatus of the present invention.

As seen in FIG. 17, each spacer 26 is formed in a manner wherein all color layers are layered. Where a spacer 26 is formed in this manner, the height $t_s$ of the spacer is given by $$t_s = t_R + t_G + t_B \quad (21)$$

Where, taking the fact that the thicknesses of scanning lines 16 and signal lines 1 are 0.15 $\mu$m and the relationship given by the expression (21) into consideration, the thicknesses $t_R$, $t_G$ and $t_B$ of the color layers for R, G and B were set to 0.96 $\mu$m, 1.45 $\mu$m and 2.15 $\mu$m, respectively, the thicknesses of the liquid crystal layer 4 at pixels for the individual colors were 5.0 $\mu$m for red, 4.5 $\mu$m for green and 3.8 $\mu$m for blue.

The thicknesses of the liquid crystal layer 4 mentioned above provide, where $\lambda_B$=460 nm, $\lambda_G$=550 nm and $\lambda_R$=610 nm are selected as wavelengths for representations of the color filters from the transmission factor spectra of the color filter shown in FIG. 14, an equal ratio between the wavelength and the thickness of the liquid crystal layer for the individual colors of the color filter.

On the color filter produced in this manner, an overcoat layer 13 was formed with the thickness of 0.1 $\mu$m.

Orientation films 23 are applied to both of the active matrix substrate and the color filter substrate produced in such a manner as described above and then rubbed in the rubbing direction 24 shown in FIG. 11. Then, the two substrates are adhered to each other and secured at peripheries thereof to each other with a seal material, and then liquid crystal is injected into and encapsulated in a space between the substrates to form a liquid crystal panel.

In the liquid crystal panel produced in such a manner as described above, since the ratios between the wavelengths representing the color filter and the thicknesses of the liquid layer are substantially equal for the individual colors of the color filter, the principle described hereinabove applies to this liquid crystal panel, and consequently, a good display characteristic free from coloring can be obtained.

While, in the working example described above, the overcoat layer is provided on the color filter, it need not particularly be provided if the stability of the color layers is sufficiently high.

Further, while, in the working example described above, the spacers 26 are formed by laying color layers of the color filter, a different layer may alternatively be formed to form the spacers 26 using a photo-lithographic technique. Further, the two techniques may be combined to form the spacers 26 by layering the color layers and the different layer.

Further, the spacers 26 need not be provided on the color filter, but as shown in FIG. 12(d), a granular spacer may be sprayed, upon combination of liquid crystal, to control the thickness of the liquid crystal layer.

Figure 18:
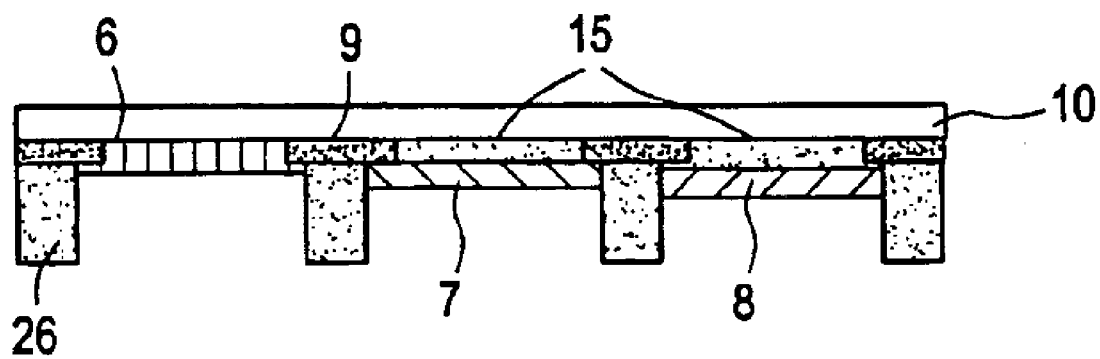
FIG. 18 is a view showing a third embodiment of the active matrix liquid crystal display apparatus of the present invention.

Furthermore, while, in the working example described above, the thickness of the liquid crystal layer is varied corresponding to the individual colors by making the thicknesses of the color layers of the color filter different from each other, the thicknesses of the liquid crystal layer corresponding to the individual colors may be controlled by layering dielectric layers different from the color layers on the individual layers while varying the thicknesses of the dielectric layers as seen in FIG. 18.

FIG. 17 is a view showing a further embodiment of the active matrix liquid crystal display apparatus of the present invention.

Further, by using the same production procedure while varying the shapes of the patterns of pixel electrodes 3 and opposing electrodes 2 in such a manner as seen in FIG. 13, a liquid crystal display panel formed from the second embodiment was obtained.

In this instance, the distance between a pixel electrode 3 and an opposing electrode 2 was set to 11 $\mu$m for pixels corresponding to red, 10 $\mu$m for pixels corresponding to green and 8.5 $\mu$m for pixels corresponding to blue. Further, in order to prevent the area of a display region held between a pixel electrode 3 and an opposing electrode 2 from being varied for the individual colors, numerical aperture adjustment portions 22 were provided for pixels 19 corresponding to red and pixels 20 corresponding to green. Consequently, while the difference between a pixel potential and an opposing potential necessary to obtain the highest brightness was different, in the working example of the first embodiment, for the individual colors, in a working example of the second embodiment, by application of 6.0V, the highest brightness was obtained with pixels corresponding to all of the colors. Besides, since the equal numerical aperture was obtained for all of the colors without the necessity for a special countermeasure in structure, a good white characteristic was obtained successfully.

Since the present invention is constructed in such a manner as described above, it exhibits the following effects.

In the active matrix liquid crystal display apparatus as set forth in claims 1 and 2, since the liquid crystal layer has a thickness which varies depending upon transmission wavelengths of the color layers, the active matrix liquid crystal display apparatus can provide a very good display free from any coloring from whichever direction it is viewed.

In the active matrix liquid crystal display apparatus set forth in claim 3, since the distance between a pixel electrode and an opposing electrode is set different for the individual color layers, an equal voltage can be applied to the pixel electrodes corresponding to the individual color layers to achieve the effect described above, and consequently, driving is facilitated.

In the active matrix liquid crystal display apparatus set forth in claim 4, since the protective layer is provided on the surface of the first substrate adjacent the second substrate, elusion of impurities from the color layers can be prevented.

Figure 19:
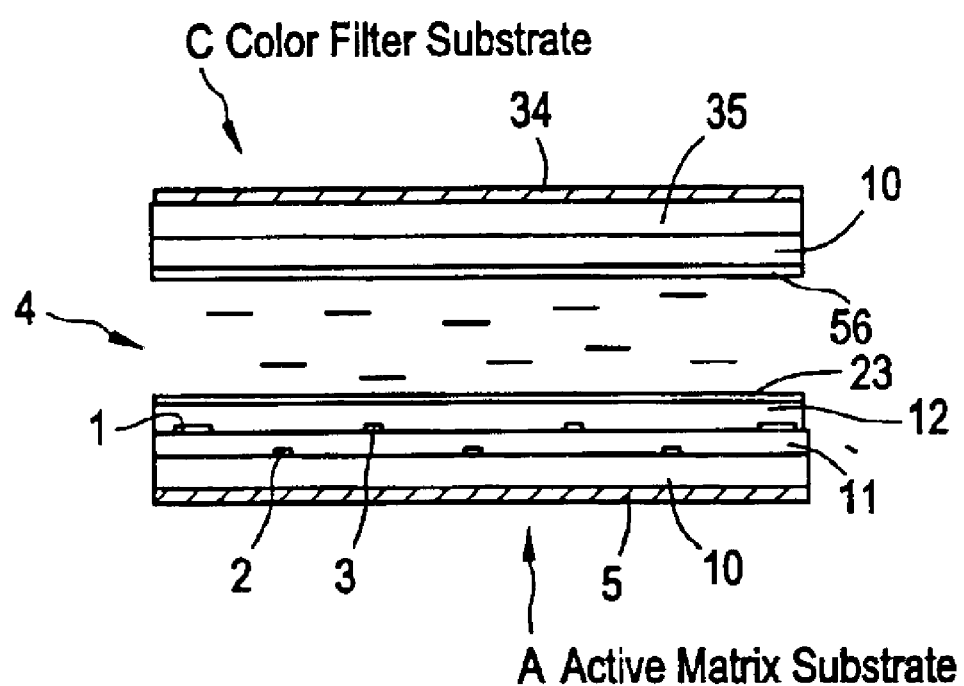
FIG. 19 is a sectional view of an active matrix liquid crystal display panel of the fourth embodiment of the present invention.
Figure 20:
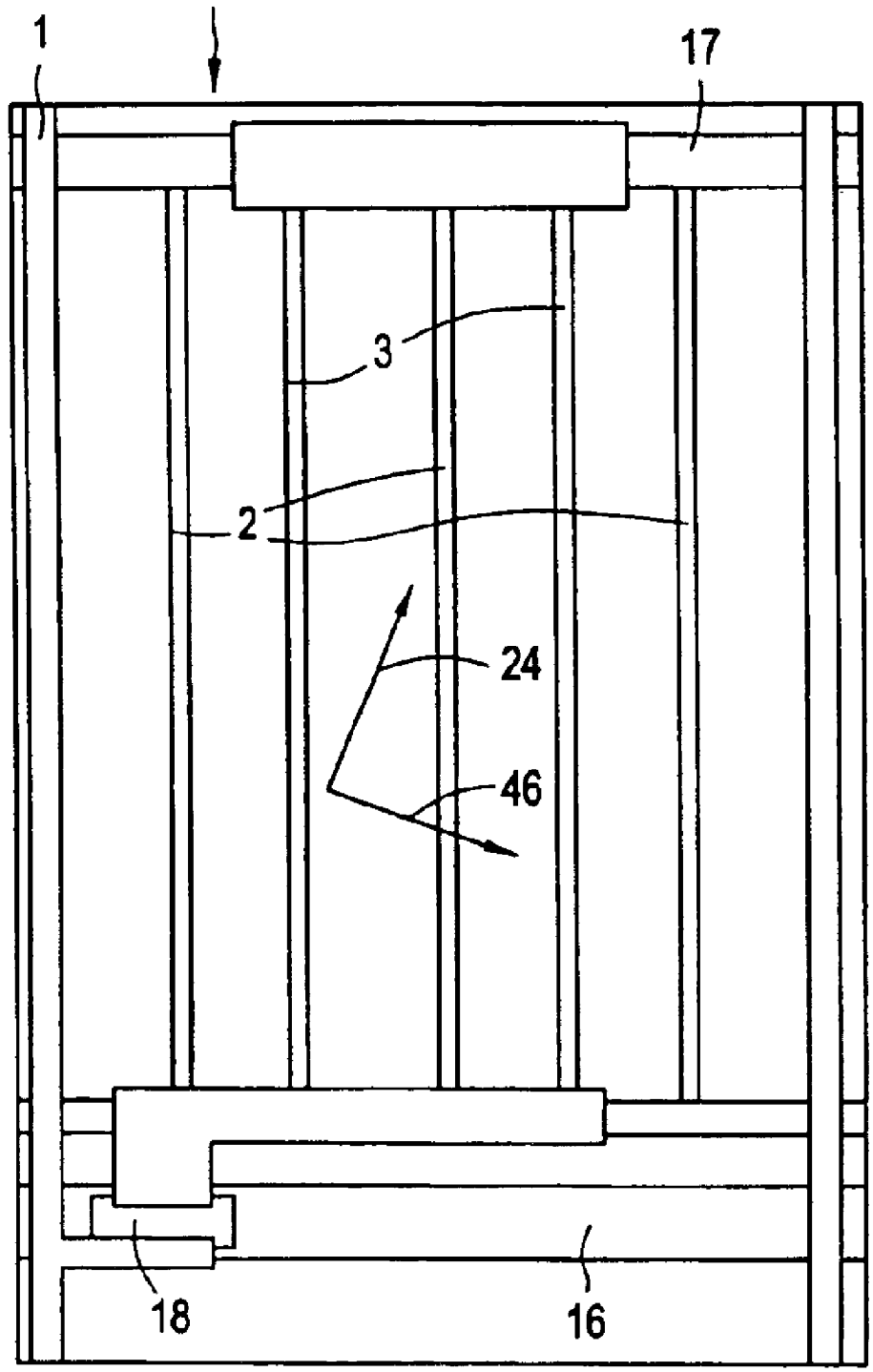
FIG. 20 is a plan view of an active matrix substrate in the fourth embodiment of the present invention.

FIG. 19 is a sectional view showing a principal portion of the fourth embodiment of the active matrix liquid crystal display panel of the present invention, and FIG. 20 is a plan view of an active matrix substrate A of the active matrix liquid crystal display panel. The active matrix substrate A of the IPS system (in the present embodiment, on the light incoming side) is described. A plurality of opposing electrodes 2 connected to each other by an opposing electrode bus line 17 and a scanning line 16 are formed on a glass substrate (transparent insulating substrate) 10, and a gate insulating film 11 is formed in such a manner as to cover over the opposing electrodes 2 and the scanning line 16. Further, island-shaped amorphous silicon 18 which makes part of a thin film transistor (hereinafter referred to simply as "TFT"),which is an active element, a plurality of pixel electrodes 3 and a signal line 1 are formed on the gate insulating film 11. The pixel electrodes 3 and the signal line 1 extend in parallel to the opposing electrodes 2. Further, a protective insulating film 12 and an orientation film 23 are formed in a layered relationship. The source electrode of the TFT is connected to the pixel electrodes 3 while the drain electrode is connected to the signal line 1, and the scanning line 16 serves as the gate electrode of the TFT. The active matrix substrate A of the IPS system having the TFT is formed in this manner. It is to be noted that details of the method of production are hereinafter described.

A color filter substrate C (in the present embodiment, on the light outgoing side) includes an orientation film 56 same as that on the active matrix substrate A side and provided on one of the two surfaces of another glass substrate (transparent insulating substrate) 10, and an optical compensation layer 35 formed from a plastic film and provided on the other surface of the glass substrate 10.

The active matrix substrate A and the color filter substrate C are disposed such that the orientation films thereof are opposed to each other, and a pair of polarizing plates are disposed on the outer sides of the two substrates while a liquid crystal layer 4 having a positive refractive index anisotropy is provided between the orientation films 23 of the two substrates. It is to be noted that the polarizing plate on the light incoming side serves as a polarizing plate 5 and the polarizing plate on the light outgoing side serves as an analyzer 34.

Figure 21:
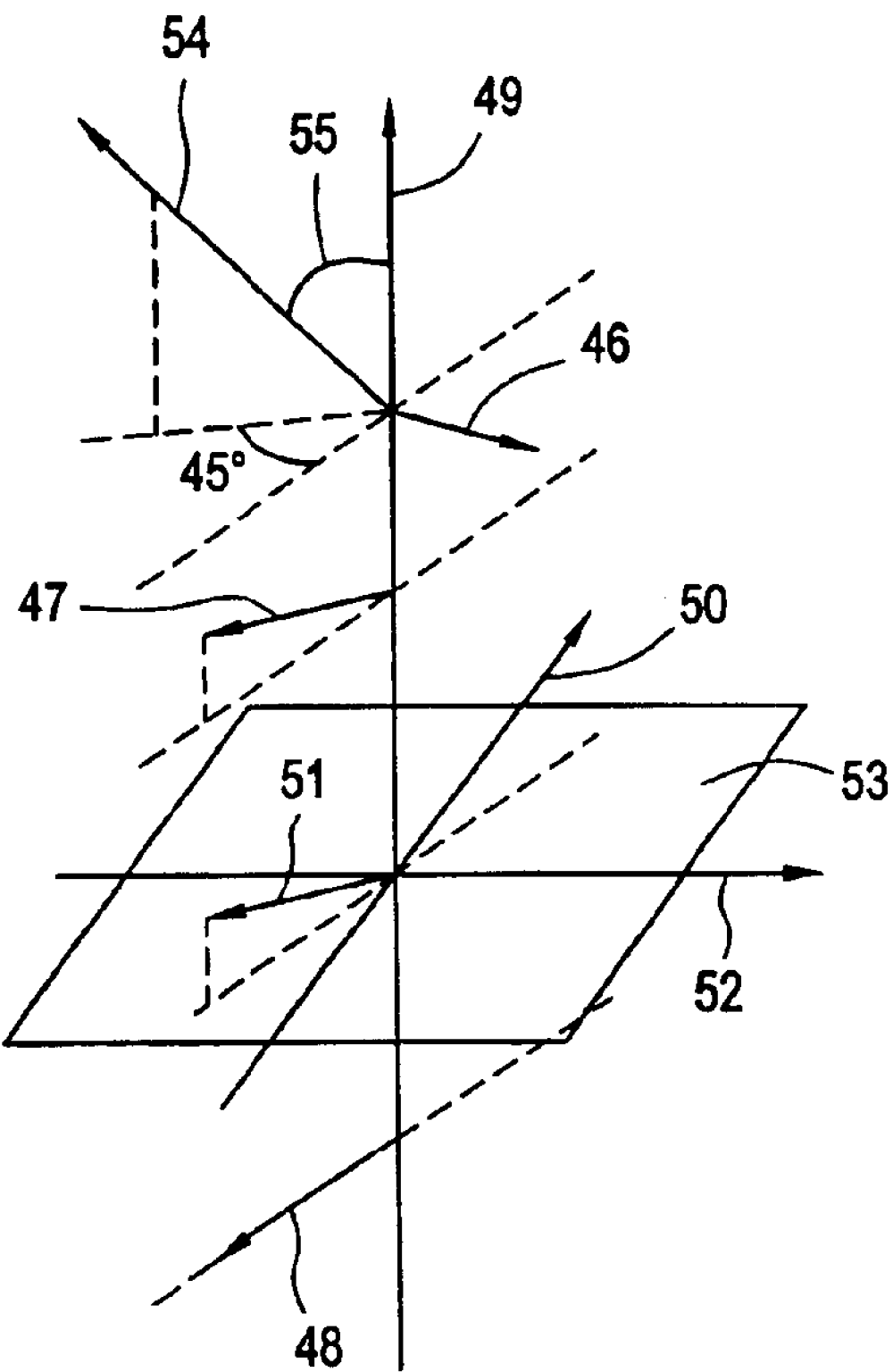
FIG. 21 is a diagrammatic view illustrating a relationship among the polarization axis, the liquid crystal directors and an the refractive index anisotropic axis of an optical compensation layer in the fourth embodiment of the present invention.

FIG. 21 illustrates the relationship among a polarization direction 48 of the polarizer, a polarization direction 46 of the analyzer, a director direction 51 of a liquid crystal molecule, a direction 47 of the refractive index anisotropy axis of the optical compensation layer, a substrate normal 49, a longitudinal direction 50 of the electrodes and a direction 52 of an electric field. The substrate normal 49, the longitudinal direction 50 of the electrodes and the direction 52 of the electric field expend perpendicularly to each other. Each broken line in FIG. 21 represents the polarization direction 48 of the polarizer. The polarization direction 48 extends in parallel to a substrate plane 53 and defines a fixed angle with respect to the longitudinal direction 50 of the electrodes. The polarization direction 46 of the analyzer is perpendicular to the polarization direction 48 of the polarizer.

Liquid crystal molecules are oriented uniformly by the orientation film 23, and the directors 51 (longitudinal directions) thereof are inclined by a fixed angle (pretilt angle) with respect to the substrate plane 53. The pretilt angle normally ranges approximately from 1 to 10 degrees. Projections of the directors 51 of the liquid crystal molecules on the substrate plane 53 extend in parallel to the polarization direction 48 of the polarizer, and the refractive index anisotropic axis 47 of the optical compensation layer extends in parallel to the directors 51. The polarization direction 46 of the analyzer extends perpendicularly to the polarization direction 48 of the polarizer and in parallel to the substrate plane 53.

Some of conventional active matrix liquid crystal display panels of the transverse electric field type are controlled based on the following theory. In particular, where the potential difference between a pixel electrode and an opposing electrode is 0 (when no electric field is applied), light is absorbed by the polarizer and the analyzer and black is displayed. However, if an electric field is applied, then the directors are turned, and as the potential difference increases, the directors 51 are further turned. Consequently, components which are not absorbed by the analyzer increase in a ray which has passed through the liquid crystal layer and the transmission factor increases, approaching a white display. Then, when the directors 51 are turned approximately by 45 degrees, the transmission factor (brightness) exhibits a maximum value.

Conventionally, however, even if control is performed based on this theory, it sometimes occurs that the display does not look well. As described above, when a substrate is viewed obliquely, principally from the fact that linearly polarized light after passing through the polarizing plates 5 undergoes, when it passes through the liquid crystal layer 4, a retardation so that it is converted into elliptically polarized light, even when no electric field is applied and the liquid crystal molecules are not turned, light sometimes comes into the analyzer 34 from the liquid crystal layer 4 while it includes polarized light components which cannot be absorbed by the analyzer 34. According to a result of detailed numerical calculation with the relationship between the direction of the pretilt angle and the direction of the ray taken into consideration, when viewed from a direction 54 (refer to FIG. 21), the transmission factor is very high comparing with that where the liquid crystal layer 4 is not present and only the polarizing plates of a cross nicol are viewed from the same direction 54. In other words, where black is to be displayed, it looks rather white and this deteriorates the display quality.

Therefore, in the present invention, the optical compensation layer 35 is provided. In the present embodiment, the optical compensation layer 35 which has a negative one axis refractive index anisotropy is provided between the glass substrate 10 and the analyzer 34, and the refractive index anisotropic axis 47 thereof extends in parallel to the directors 51 of the liquid crystal while the optical main axis in the liquid crystal layer 4 and the optical main axis in the optical compensation layer 35 extend in a substantially same direction. When light passes through the liquid crystal layer 4, it undergoes distortion of the polarization plane thereof by a retardation, and the polarization plane distorted in this manner is compensated for by the optical compensation layer 35 so that the polarization condition of the light approaches the polarization condition (linear polarization) at the time immediately after the light passes through the polarizer 5. Then, after the light passes through the optical compensation layer 35, it is absorbed by the analyzer 34 so that black is displayed. In this manner, the present invention exhibits an effect in that white floating in a black display can be suppressed by canceling a retardation which occurs in the liquid crystal layer 4 when black is to be displayed by means of the optical compensation layer 35 irrespective of the incoming direction of the ray. Besides, little influence is had on any other visibility angle characteristic than this. Accordingly, a liquid crystal display panel which has a very wide visibility angle characteristic can be obtained.

As described above, since the direction 47 of the optical axis (refractive index anisotropic axis) of the optical compensation layer 35 is the same as the direction (direction of directors) 51 of the optical axis of the liquid crystal layer 4, at whichever angle light comes in, the optical main axis of the light when the light passes through the liquid crystal layer 4 and the optical main axis of the light when the light passes through the optical compensation layer 35 are substantially same as each other, and the liquid crystal layer 4 having a positive refractive index anisotropy and the optical compensation layer 35 having a negative refractive index anisotropy can be canceled effectively. Further, even if the optical compensation layer 35 which has a refractive index anisotropic axis in this direction is present, the transmission factor when the liquid crystal display panel is viewed from the front is not varied by it at all and also the visibility angle characteristics of white and half tones other than the black level are varied little. Accordingly, white floating of a black display can be prevented efficiently and gradation reversal can be prevented, and a better visibility angle characteristic can be achieved.

The distortion of the polarization plane of the light when the light passes through the liquid crystal layer 4 is composed of a retardation which increases in proportion to the product of the refractive index difference between the optical main axes and the optical path lengths. In order to correct the distortion, a retardation in the opposite direction should be applied by the optical compensation layer 35. If the refraction indices of the liquid crystal layer 4 and the optical compensation layer 35 with regard to ordinary light are substantially equal to each other, then the ratios between the layer thicknesses and the optical path lengths are substantially equal to each other. Further, since the anisotropic axes of the refractive indices are common to each other and also the main axes upon passage of the ray are substantially same as each other, also the refractive index difference between the optical main axes and the refractive index anisotropies of the individual layers increase in proportion to each other. From the foregoing, by making the product $\Delta nL_C \cdot dL_C$ of the refractive index anisotropy $\Delta nL_C$ and the liquid crystal layer thickness $dL_C$ of the liquid crystal layer 4 and the product $\Delta n_F \cdot d_F$ of the refractive index anisotropy $\Delta n_F$ and the layer thickness $d_F$ of the optical compensation layer 35 substantially coincide with other, the distortion (retardation) of the polarization plane produced in the liquid crystal layer can be corrected substantially fully by the optical compensation layer, white floating can be suppressed to a level substantially equal to that obtained where only the cross Nicol is used.

It is to be noted that, as described above, in order to achieve more complete compensation, the refractive index of the liquid crystal layer 4 for ordinary light and the refractive index of the optical compensation layer 35 for ordinary light are preferably set equal to each other. Where the refractive indices of them are different from each other, a ray passes in finely different directions through the layers, resulting in fine differences of the directions of the optical main axes, the refractive index differences on the main axes and the optical path lengths, and consequently, complete compensation cannot be achieved. However, if the refractive indices of them are made coincide with each other, then the optical main axes coincide completely with each other, and compensation of retardations of the liquid crystal layer 4 and the optical compensation layer 35 can be achieved more completely.

Figure 1:
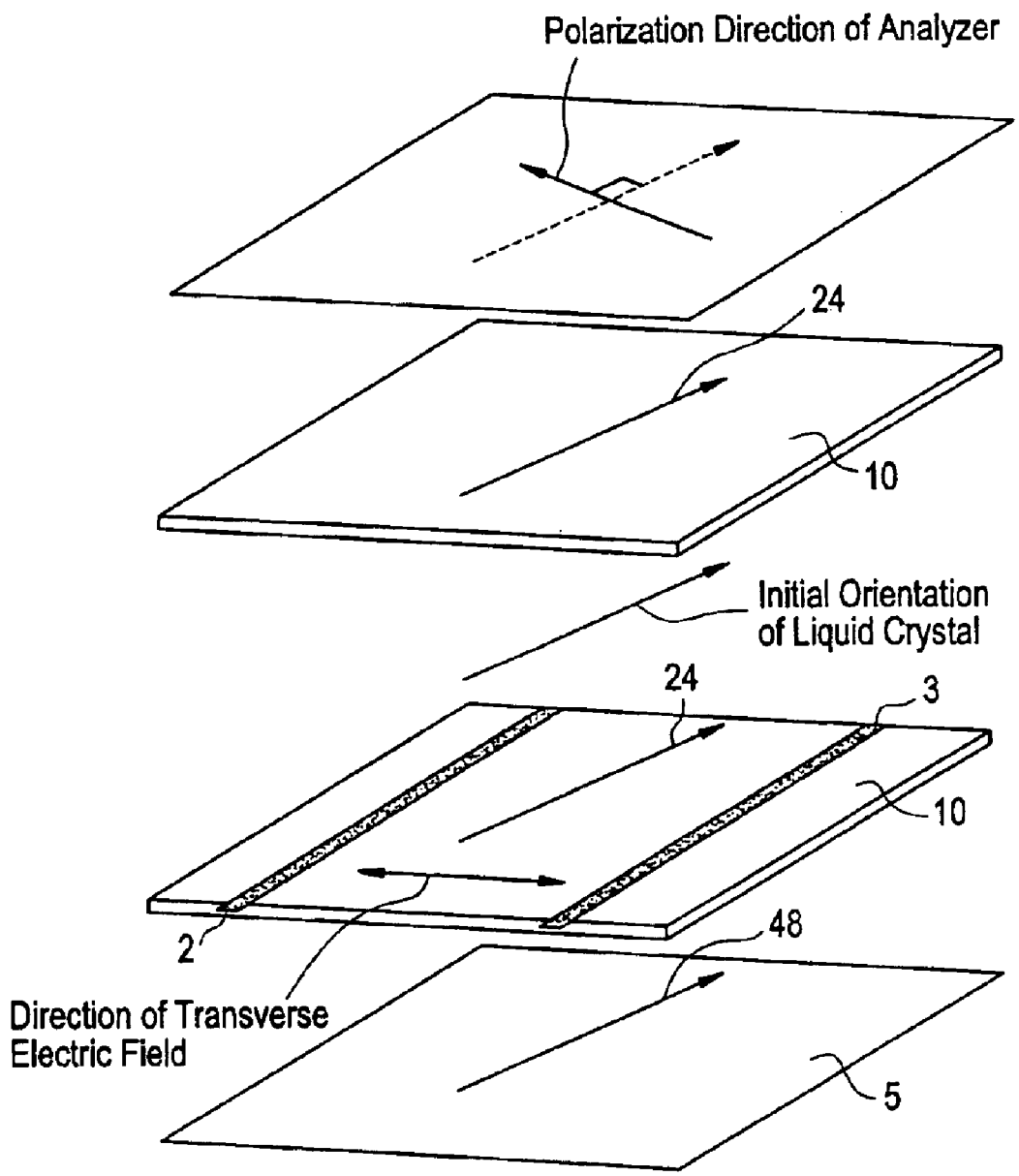
FIG. 1 is a view showing a liquid crystal display system of the transverse electric field driven type which exhibits a good display characteristic.
Figure 2A:
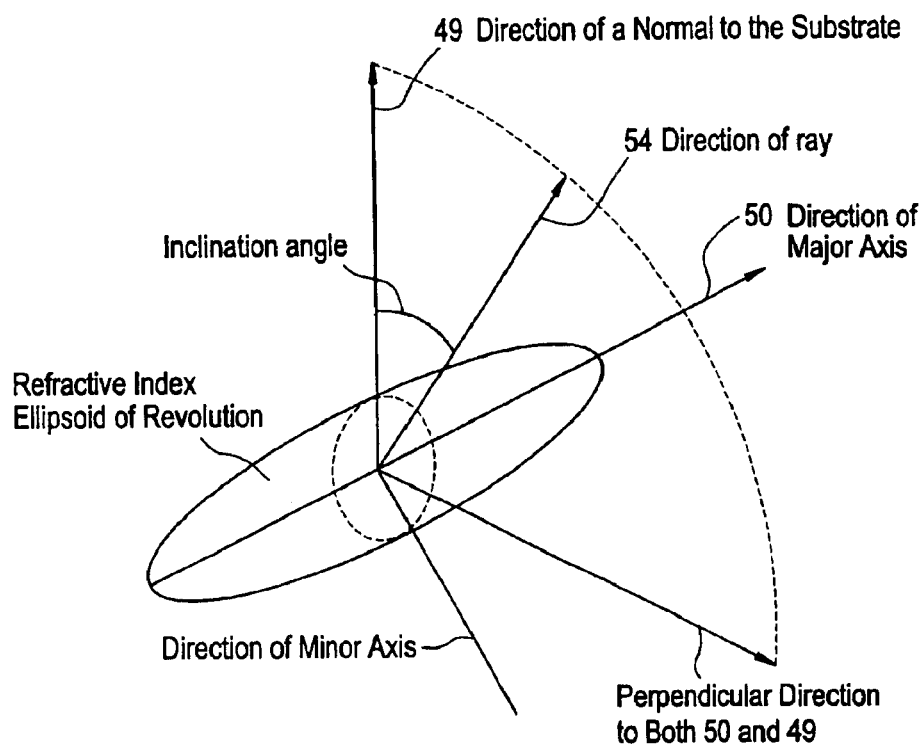
Figure 2B:
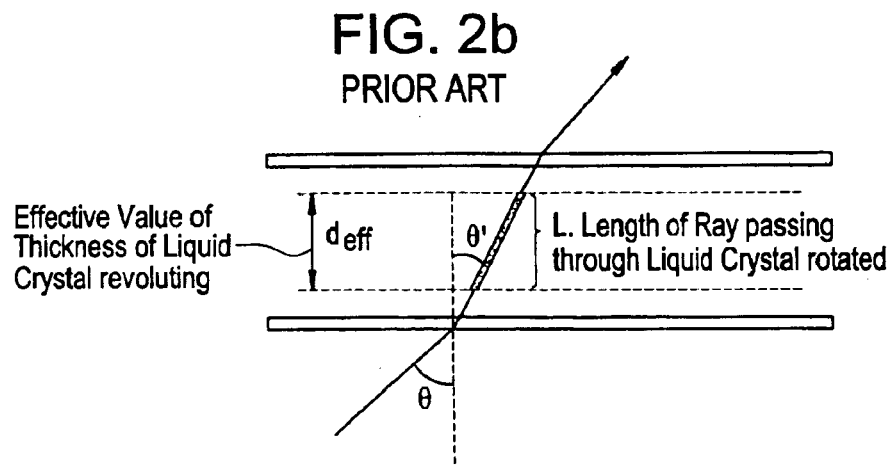
Figure 3:
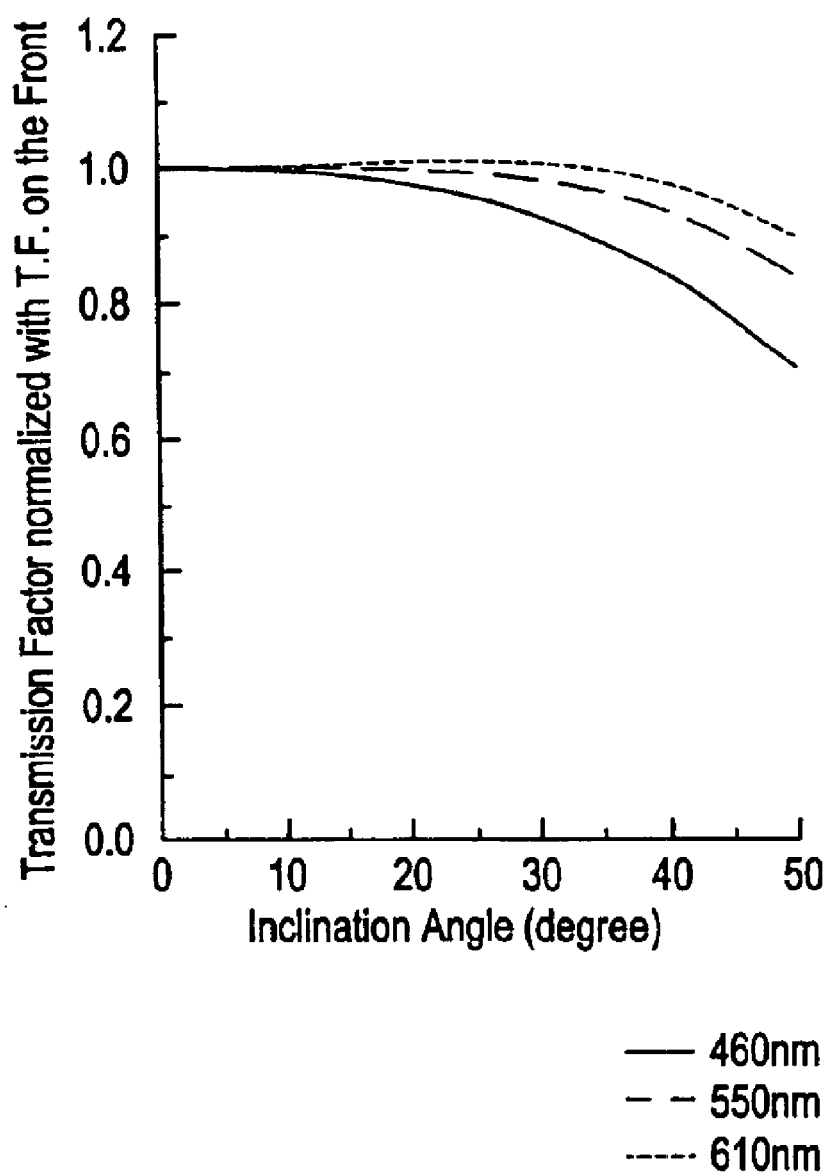
FIG. 3 is a diagram illustrating a relationship between the inclination angle and the transmission factor when light comes in, when white is to be displayed, in a direction perpendicular to the liquid crystal directors and oblique to the substrate.
Figure 4:
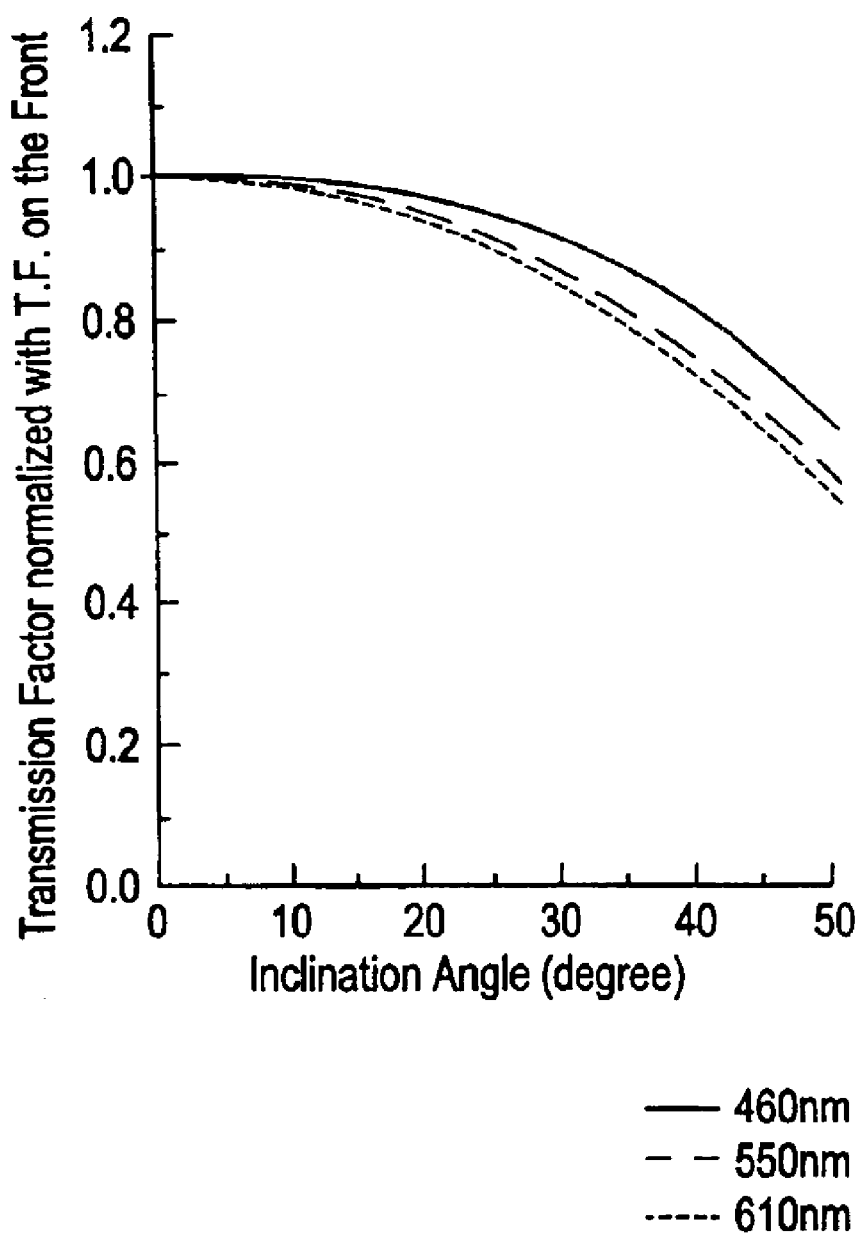
FIG. 4 is a diagram illustrating a relationship between the inclination angle and the transmission factor when light comes in, when white is to be displayed, in a direction same as that of the liquid crystal directors and oblique to the substrate.
Figure 5:
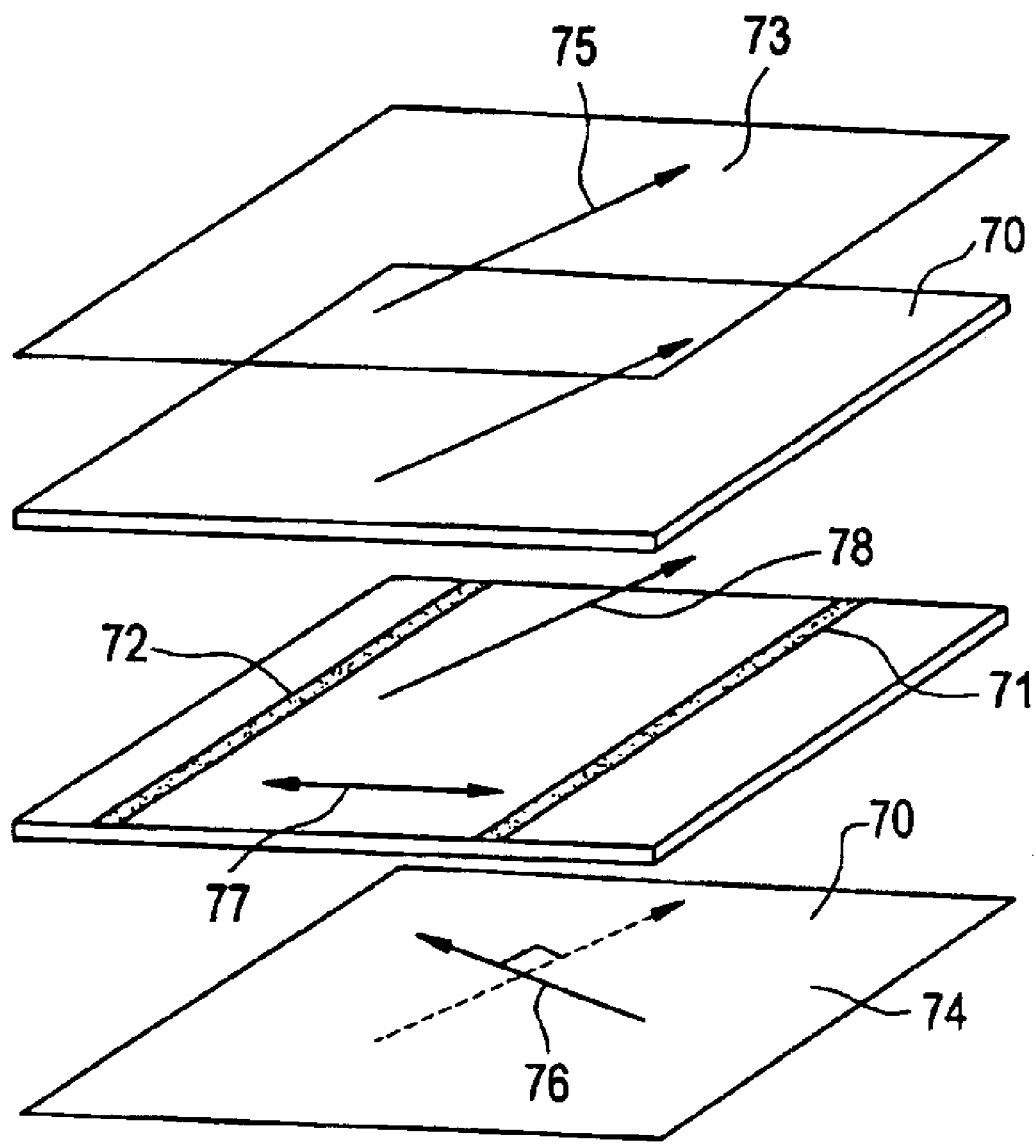
FIG. 5 is a diagrammatic view showing a construction of a conventional active matrix liquid crystal display panel of the IPS system and illustrating the relationship between a polarization axis and the direction of an electric field.
Figure 6:
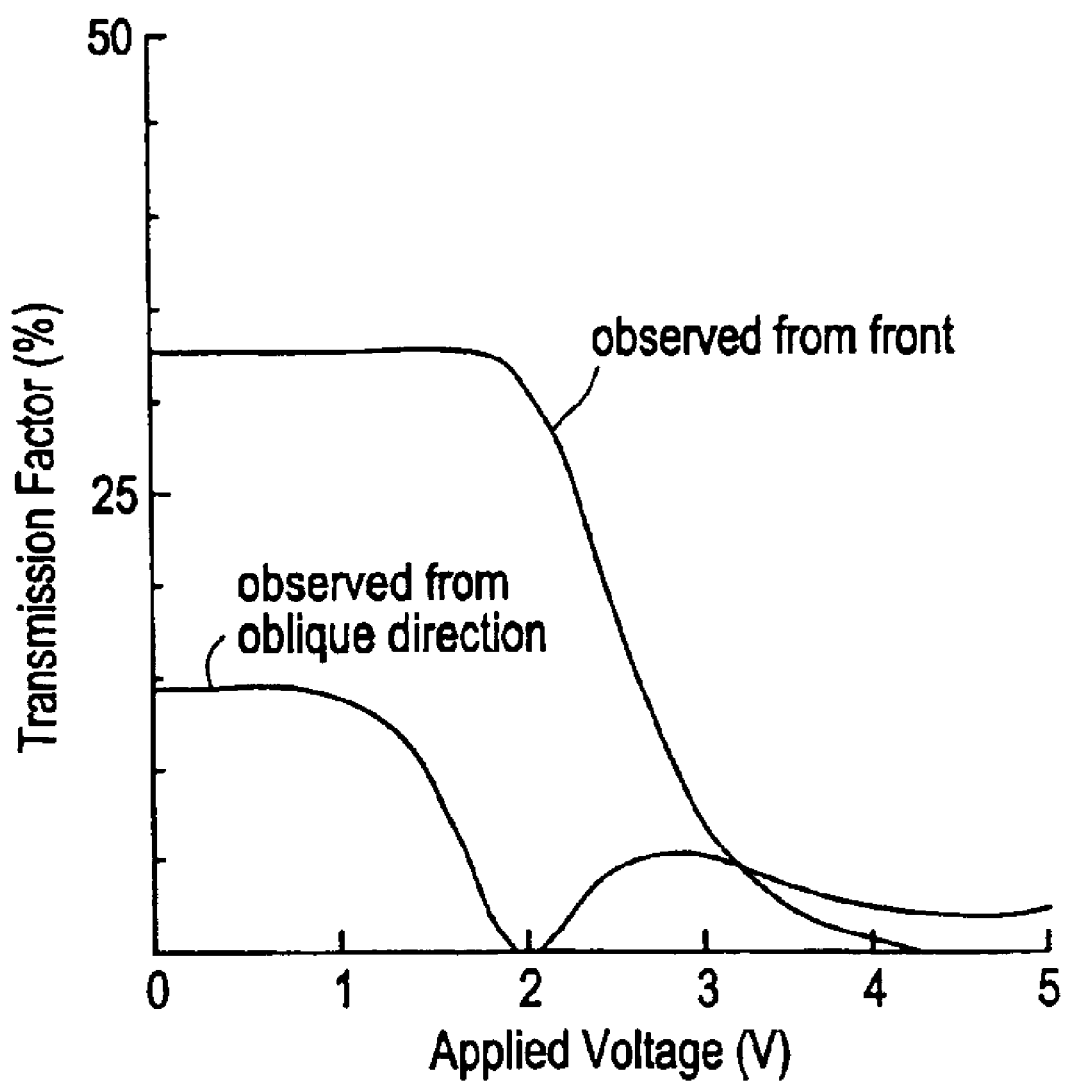
FIG. 6 is a diagram illustrating the relationship between the voltage and the transmission factor of a conventional active matrix liquid crystal display panel of the TN system.
Figure 7:
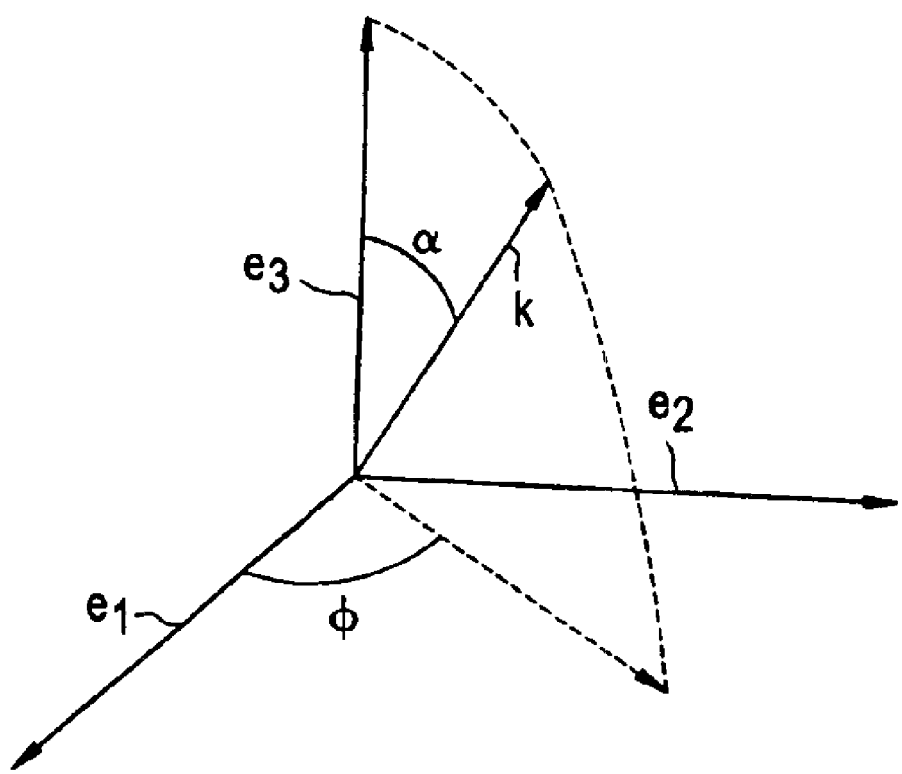
FIG. 7 is a diagram showing a polarization axis, the direction of a ray, the azimuth and the zenithal angle of the conventional active matrix liquid crystal display panel of the IPS system.
Figure 8:
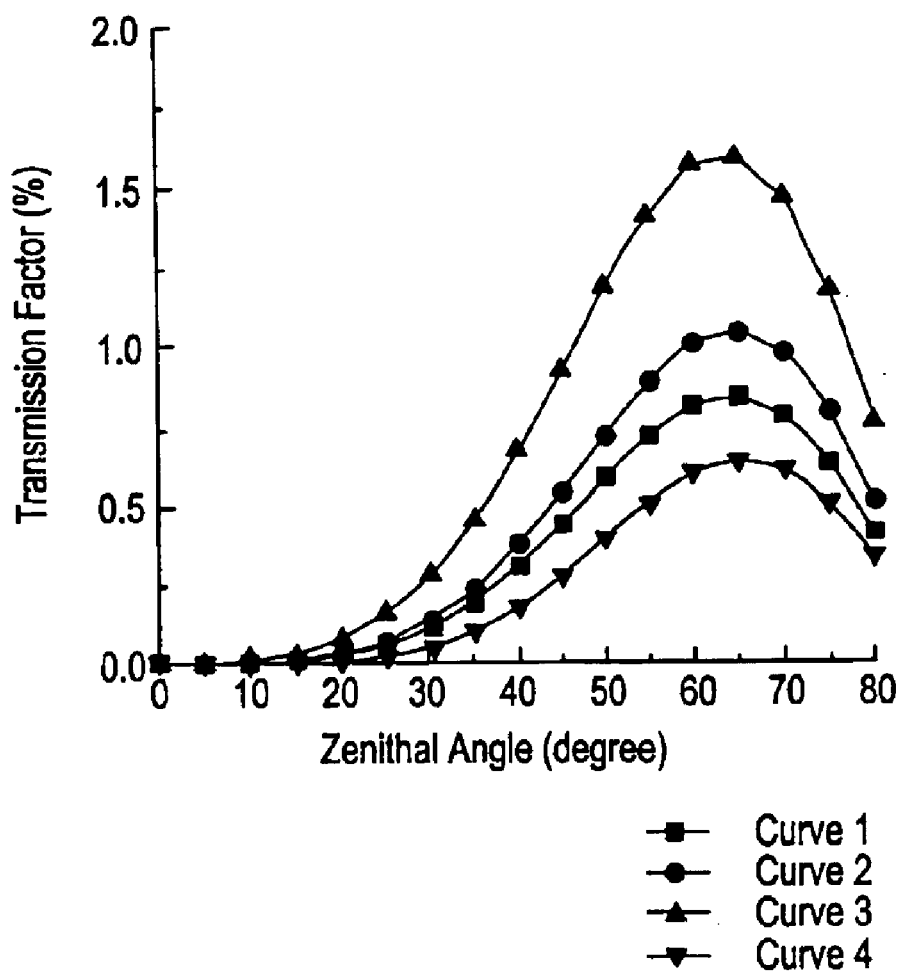
FIG. 8 is a diagram illustrating relationships between the zenithal angle and the transmission factor at various pretilt angles of the conventional active matrix liquid crystal display panel of the IPS system when no voltage is applied.
Figure 9:
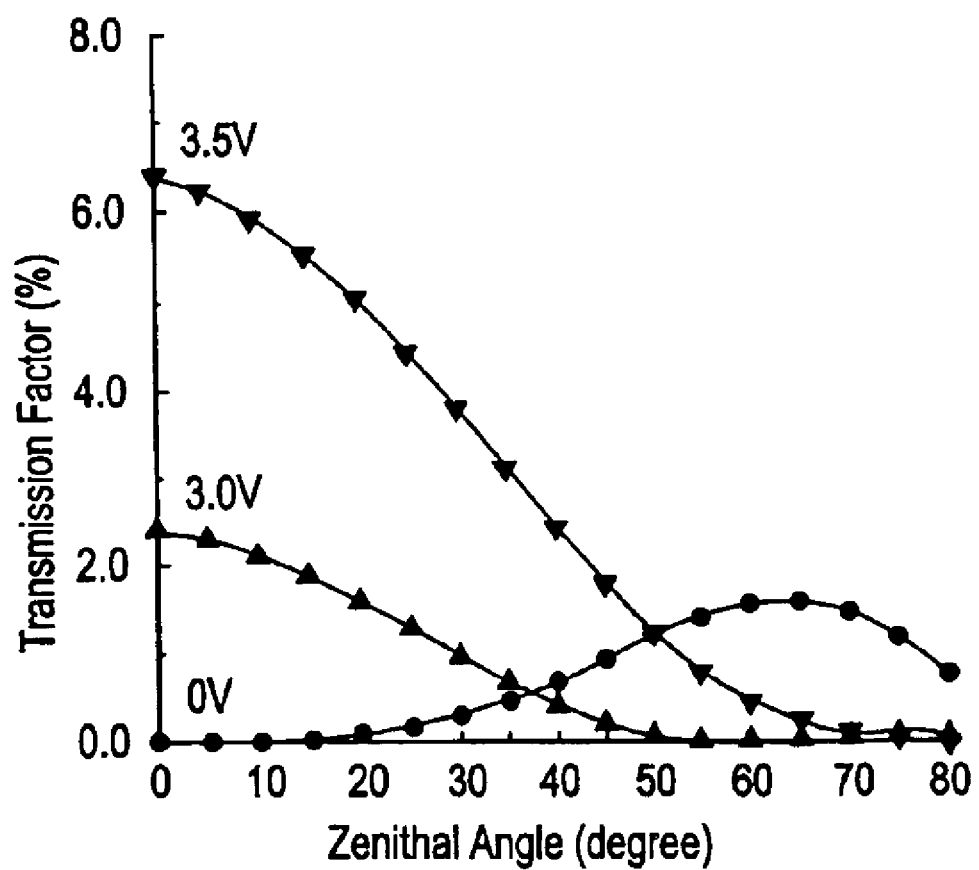
FIG. 9 is a diagram illustrating a relationship between the zenithal angle and the transmission factor of a conventional active matrix liquid crystal display panel of the IPS system wherein the pretilt angle is 3 degrees when a voltage is applied or no voltage is applied.
Figure 22:
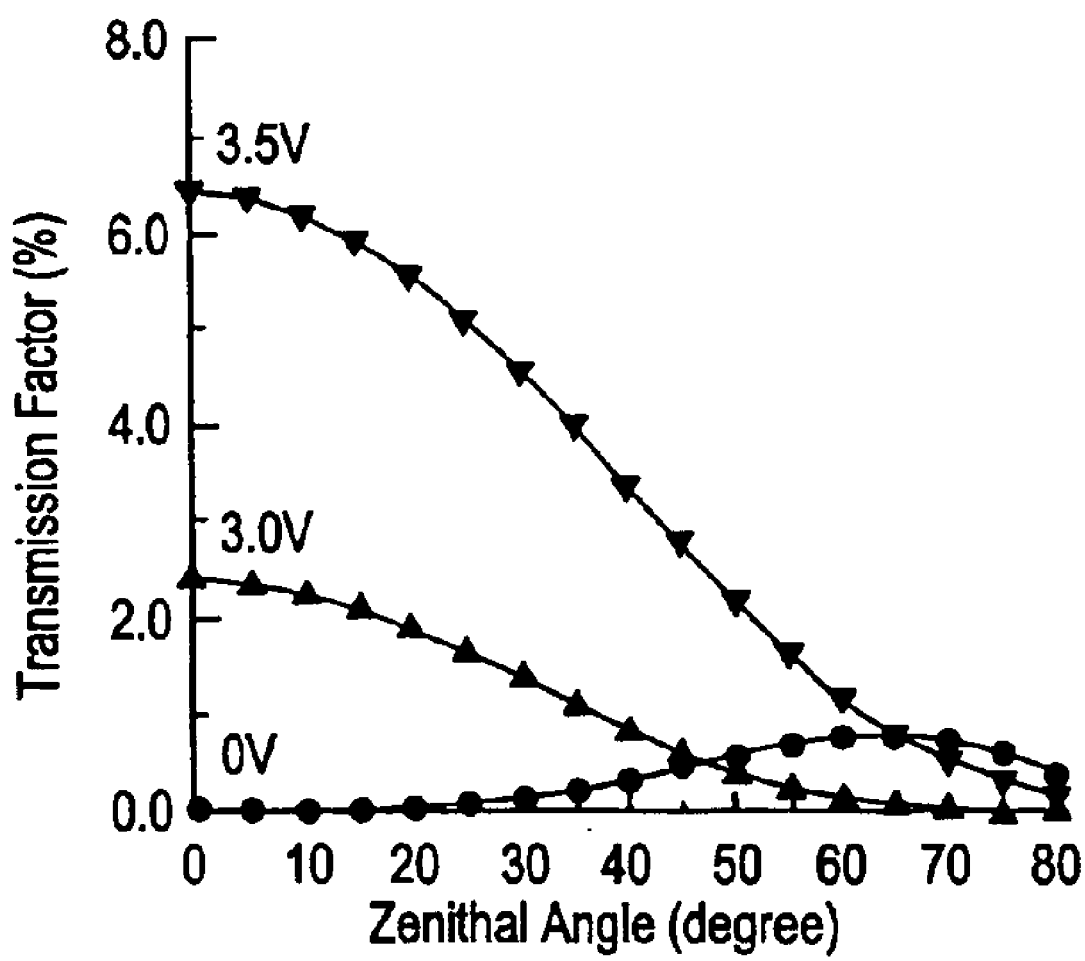
FIG. 22 is a diagram illustrating a relationship between the zenithal angle and the transmission factor of the fourth embodiment when no voltage is applied or a low voltage is applied.

A relationship of the zenithal angle 55 and the transmission factor in the active matrix liquid crystal display panel when a substrate is actually viewed from a direction of the azimuth of 45 degrees with reference to the direction of the polarization axis 48 of the polarizer as shown in FIG. 21 is illustrated in FIG. 22. While, where the optical compensation layer 35 is absent, the transmission factor exhibits a reversal at the small zenithal angle 55 of approximately 35 degrees as seen in FIG. 9, by employing the optical compensation layer 35, the zenithal angle 55 at which the transmission factor exhibits a reversal can be driven to a range higher by 10 degrees or more, and also the brightness when a transmission factor reversal occurs can be suppressed to a considerably low level.

Figure 10:
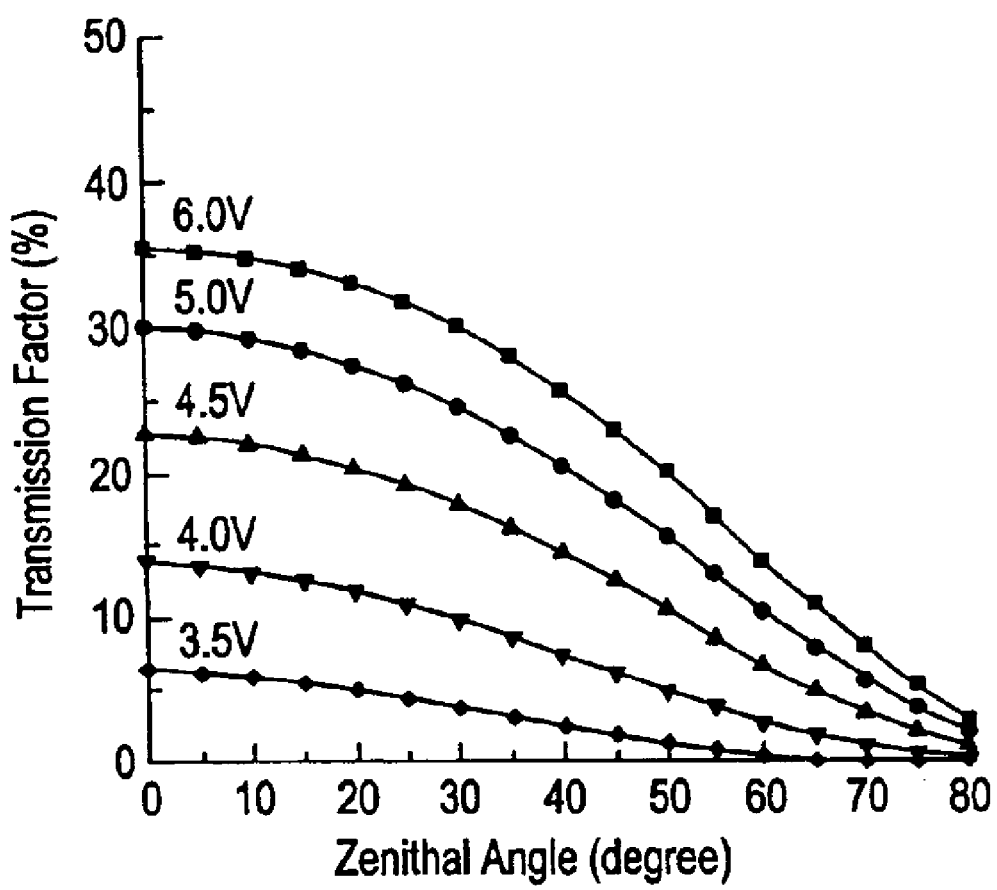
FIG. 10 is a diagram illustrating a relationship between the zenithal angle and the transmission factor of a conventional active matrix liquid crystal display panel of the IPS system when a high voltage is applied.
Figure 23:
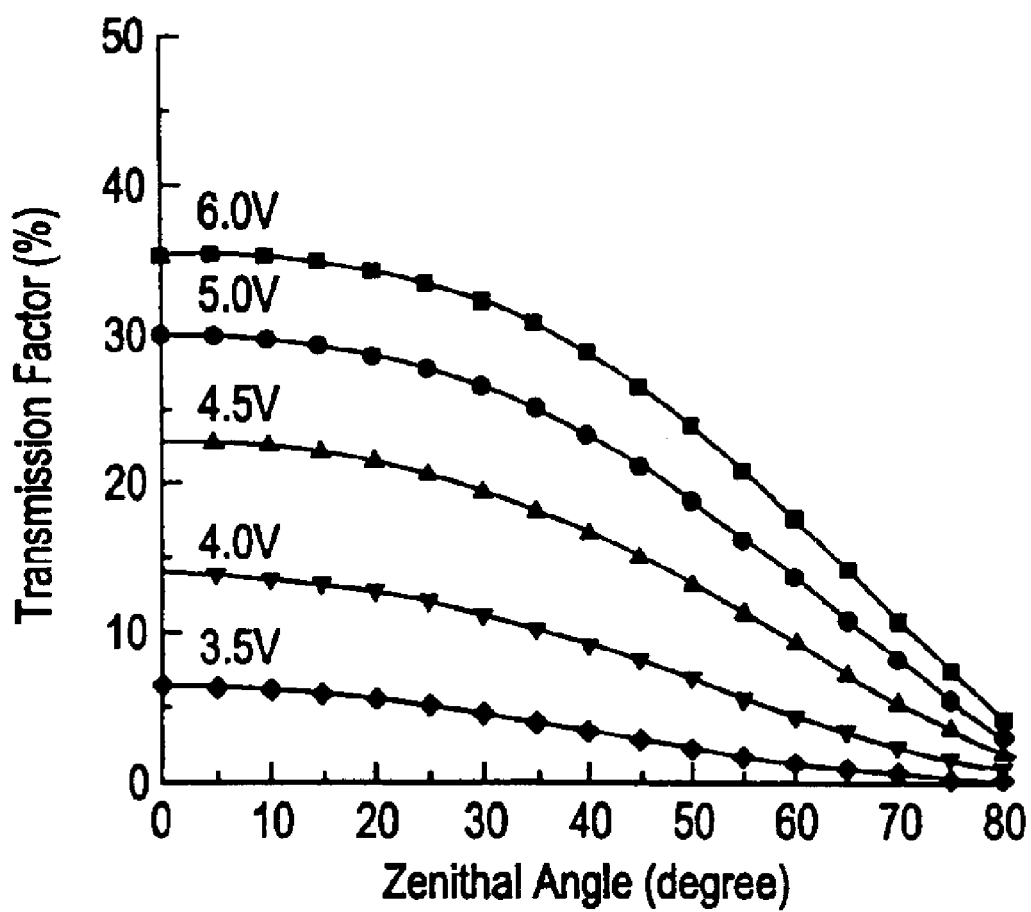
FIG. 23 is a diagram illustrating a relationship between the zenithal angle and the transmission factor of the fourth embodiment when a high voltage is applied.

A decrease of the white brightness of an electric field applied portion of the active matrix liquid crystal display panel when it is viewed from an oblique direction where the optical compensation layer 35 is absent is illustrated in FIG. 23, and a decrease of the white brightness of an electric field applied portion of the active matrix liquid crystal display panel when it is viewed from an oblique direction where the optical compensation layer 35 is provided is illustrated in FIG. 10. From FIGS. 23 and 10, it can be seen that, with the liquid crystal display panel which includes the optical compensation layer 35, the decrease of the white brightness is suppressed smaller than that with the panel which does not include an optical compensation layer, and deterioration of the display quality is suppressed low at both of a black display portion and a white display portion by the action of the optical compensation layer 35.

An example of a method of producing a liquid crystal display panel having such a construction as described above is described in detail.

First, a method of producing the active matrix substrate A is described.

As a metal layer from which the scanning lines 16, opposing electrodes 2 and opposing electrode bus lines 17 are to be produced, a Cr film is layered with 150 nm on a transparent glass substrate and then patterned. Further, as the gate insulating film 11, a silicon nitride film of 400 nm thick, a non-doped amorphous silicon film of 350 nm thick and an n-type amorphous silicon film of 30 nm thick are successively layered. Thereafter, the n-type amorphous silicon layer and the non-doped amorphous silicon layer are patterned to form island-shaped amorphous silicon 18. Then, as a metal layer from which the signal lines 1 and the pixel electrodes 3 are to be formed, a Cr film is layered with 150 nm and then patterned. Further, the protective insulating film 12 is formed and then removed at peripheral terminal portions thereof, thereby completing a TFT.

To the active matrix substrate A produced in such a manner as described above and a color filter substrate C, the orientation films 23 and 56 are applied, respectively. The orientation film 23 on the active matrix substrate side is rubbed in the direction 24 in FIG. 19, and the orientation film 56 on the color filter substrate side is rubbed in the opposite direction to the direction 24 in FIG. 24. The two substrates are disposed such that the two orientation films 23 oppose each other and are secured to each other at peripheral portions thereof by a seal member (not shown). Thereafter, liquid crystal is injected into and enclosed in a gap between the two orientation films to provide the liquid crystal layer 4. It is to be noted that the liquid crystal directors 51 are oriented substantially in a fixed direction in the liquid crystal layer 4 by the orientation films 23 and 56. The pretilt angle between the liquid crystal directors 51 and the substrate plane 53 in the present embodiment is 3 degrees. The refractive index of the injected liquid crystal for ordinary light is no=1.476 and the refractive index anisotropy is Δn=0.067, and in order to optimize the brightness of a white display and the color reproduction property, the cell gap was set to 4.5 μm.

Further, a plastic film to serve as the optical compensation layer 35 is applied to the outer side of the color filter substrate. The optical compensation layer 35 has a negative one axial refractive index factor anisotropy, and the refractive index anisotropic axis extends in a direction parallel to the initial orientation direction of the liquid crystal directors 51, that is, in a direction in which it defines 3 degrees with respect to the plane of the substrate. The product $\Delta n_F \cdot d_F$ of the refractive index anisotropy $\Delta n_F$ and the layer thickness $d_F$ Of the optical compensation layer was set equal to the product of the refractive index anisotropy and the layer thickness of the liquid crystal layer and 302 nm.

Two polarizing plates are applied such that the active matrix substrate A and the color filter substrate C are held between them. In this instance, the polarization axis 48 of the polarizer (light incoming side polarizing plate) 5 extends in parallel to the rubbing direction 24 while the polarization axis of the analyzer (light outgoing side polarizing plate) 34 extends in a direction perpendicular to the direction of the polarization axis 48.

The liquid crystal display panel produced in this manner was driven actually. It was revealed that a good display characteristic wherein the black level was stabilized over a visibility angle range wider than ever and little gradation reversal was found was obtained successfully, and the liquid crystal display panel was able to be used over a visibility angle range of 50 degrees in the upward and downward directions and the leftward and rightward directions.

Next, a fifth embodiment of the present invention is described in detail with reference to the drawings.

The active matrix liquid crystal display panel of the present embodiment has an almost same construction and is produced by an almost same production method as the fourth embodiment, but is different from the fourth embodiment in the orientation directions of two orientation films 57 and 58 and the angle defined between the directors of liquid crystal molecule and the plane of a substrate.

Figure 24:
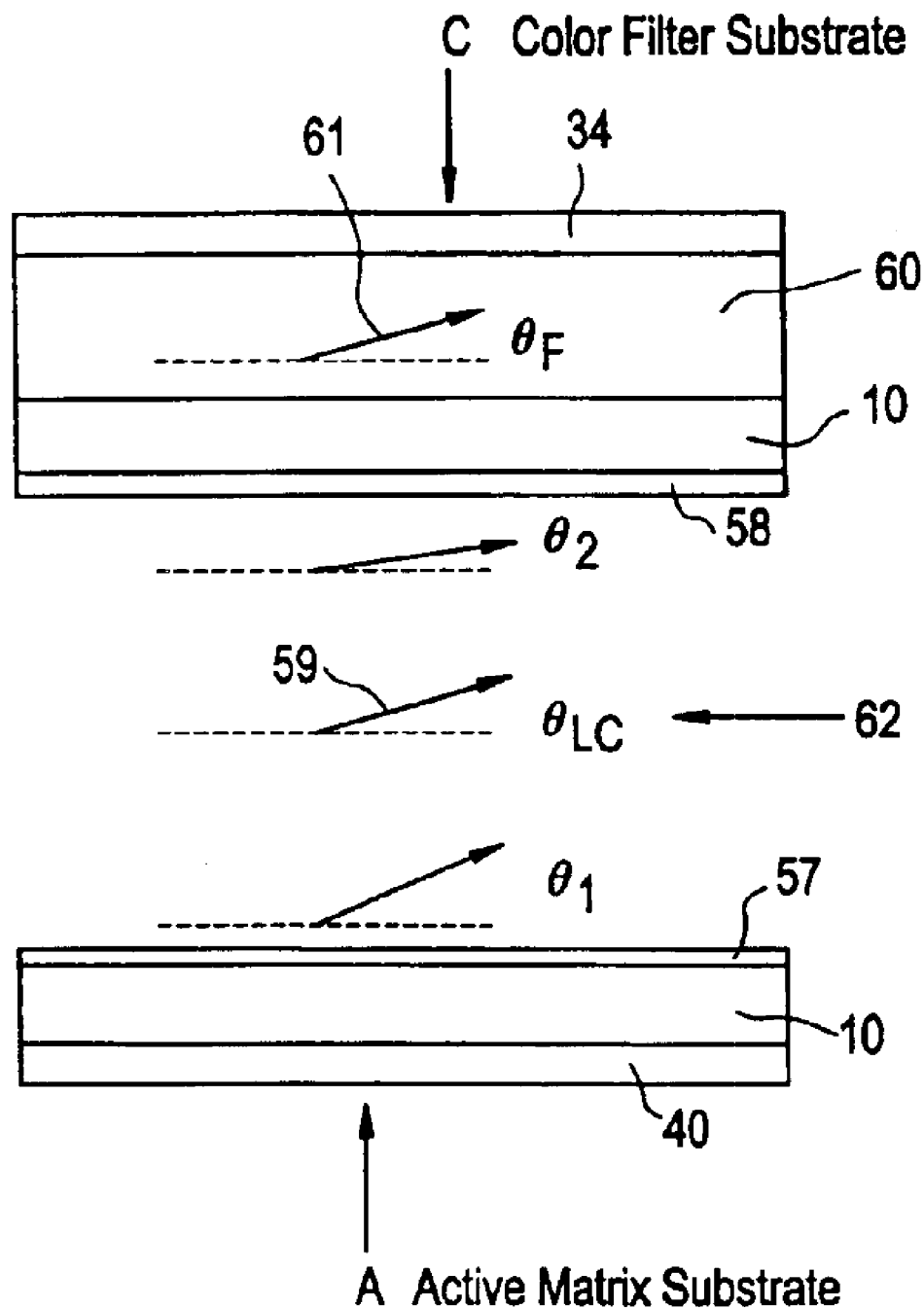
FIG. 24 is a sectional view of an active matrix liquid crystal display panel of a fifth embodiment.

FIG. 24 is a sectional view showing a section of the liquid crystal display panel taken along a plane including the polarization axis of the polarizer and a substrate normal line in order to show a direction 59 of the directors of liquid crystal molecules and a direction 61 of the refractive index anisotropic axis of an optical compensation layer 60. Here, the signal lines 1, scanning lines 16, island-shaped amorphous silicon 18, pixel electrodes 3, opposing electrodes, polarization direction 48 of the polarizer, polarization direction 76 of the analyzer and so forth have same constructions as those of the fourth embodiment (refer to FIGS. 19 to 21).

The orientation films 57 and 58 are subject to orientation processing (rubbing) in the same direction (same direction as the direction 24 of FIG. 20). The direction 59 of the directors liquid crystal molecules vary in a liquid crystal layer 62. While projections of the directors of all liquid crystal molecules on the plane of the substrate extend in the same direction parallel to the polarization direction 48 of the polarizer, the angle defined between the directors 59 of liquid crystal molecules and the plane of the substrate is different between that on the light incoming side substrate interface and that on the light outgoing side substrate interface. Where the angles are represented by $\theta_1$ and $\theta_2$, respectively, the angle $\theta L_C$ of the directors with respect to the plane of the substrate continuously varies between the two interfaces and is distributed so as to minimize the strain energy.

The optical compensation layer 60 formed from a plastic film applied to the outer side of the color filter substrate C has a negative one axis refractive index anisotropy, and the direction 61 of the refractive index anisotropic axis is set such that a projection thereof on the plane of the substrate extends in parallel to projections of the polarization axis 48 of the polarizer and the directors 59 of liquid crystal molecules on the plane of the substrate. Further, the angle $\theta_F$ defined between the anisotropic axis 61 of the optical compensation layer and the plane of the substrate is uniform in the inside of the layer and $\theta_2 < \theta_F < \theta_1$ and 0.45 degrees in the present embodiment. It is to be noted that, otherwise if $\theta_1 < \theta_2$, then the angle $\theta_F$ is set so as to satisfy $\theta_1 < \theta_F < \theta_2$. The material of the liquid crystal and the cell thickness are same as those of the fourth embodiment, and the product $\Delta n_F \cdot d_F$ between the refractive index anisotropy $\Delta n_F$ and the layer thickness $d_F$ of the optical compensation layer is equal to the product of the refractive index anisotropy and the layer thickness of the liquid crystal layer 62 and 302 nm in the present embodiment.

The polarization axis 48 of the polarizer 5 from between the two polarizing plates applied to the outer sides of the liquid crystal display panel extends in parallel to the rubbing direction 24, and the polarization axis of the analyzer 34 extends in a direction perpendicular to the rubbing direction 24 (refer to FIG. 20).

In the present embodiment, an optimum value of $\theta_F$ can be determined by simulation or experiment although this is not very simple because the optical main axis in the liquid crystal layer varies in the thicknesswise direction. Conveniently, the optimum value of $\theta_F$ may be given as $\theta_F = (\theta_1 + \theta_2)/2$. Where the optimum value of $\theta_F$ is used, the retardation of the liquid crystal layer 62 and the retardation of the optical compensation layer 60 when black is to be displayed cancel each other considerably well, and white floating in a black display can be suppressed to such a degree as that of a cross nicol.

The active matrix liquid crystal display panel which was produced in such a manner as described above had a very wide visibility angle characteristic similarly as in the fourth embodiment.

It is to be noted that, in order to obtain a good black display, projections of the directors of liquid crystal molecules on the plane of the substrate are normally held substantially in coincidence with the polarization axis of a polarizing plate on one side. Then, also a projection of the refractive index anisotropic axis of the optical compensation layer 60 on the plane of the substrate is set to the same direction. Further, the angle $\theta_F$ defined between the refractive index anisotropic axis of the optical compensation layer and the plane of the substrate can be set to a suitable position between $\theta_1$ and $\theta_2$ so that white floating can be suppressed efficiently.

Next, a sixth embodiment of the present invention is described in detail with reference to the drawings.

The active matrix liquid crystal display panel of the present embodiment has an almost same construction and is produced by an almost same production method as the fifth embodiment, but is different from the fifth embodiment in the angle defined between an optical compensation layer 63 and the plane of a substrate.

Figure 25:
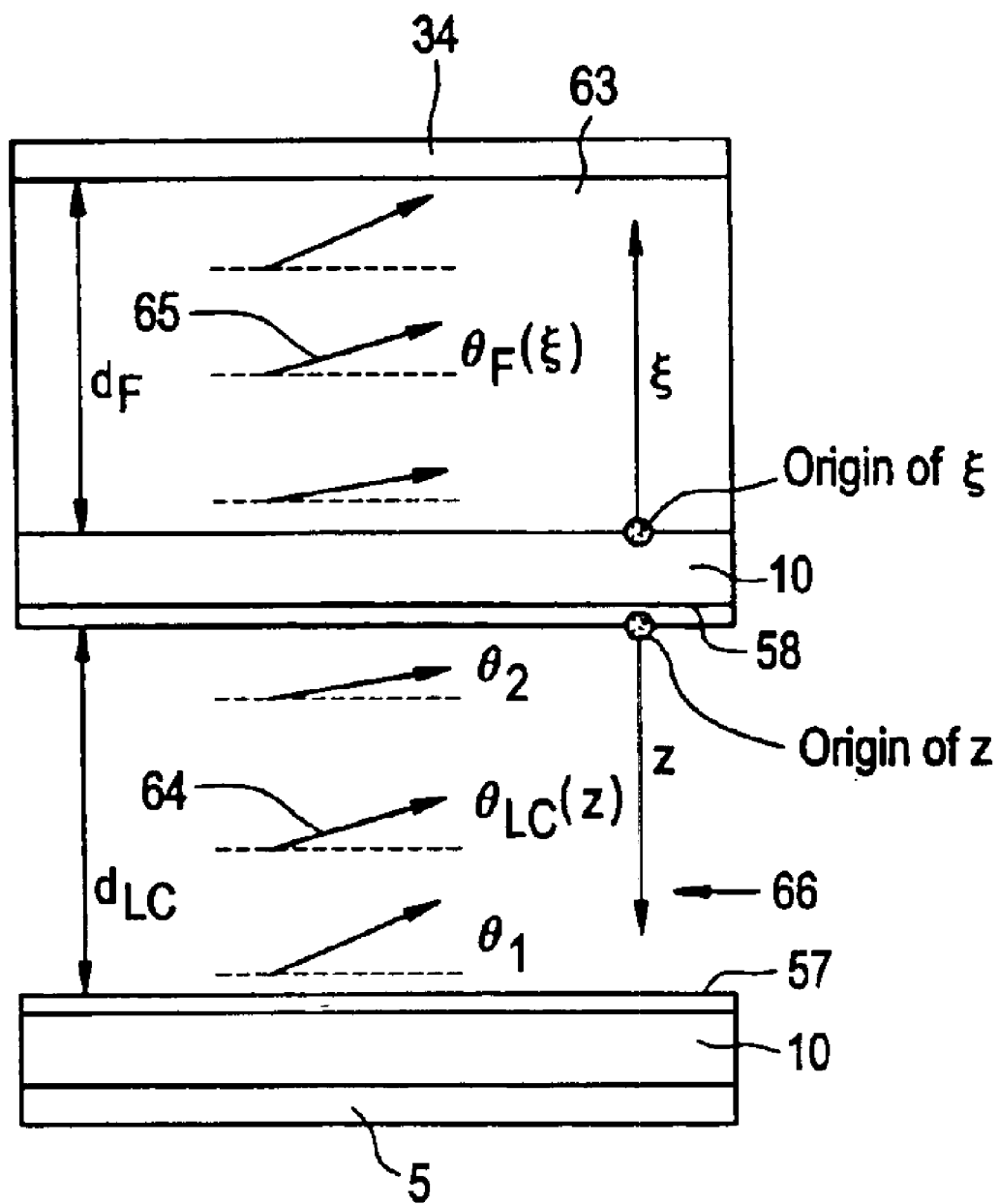
FIG. 25 is a sectional view of an active matrix liquid crystal display panel of a sixth embodiment.

FIG. 25 is a sectional view showing a section of the liquid crystal display panel taken along a plane including the polarization axis of the polarizer 5 and a substrate normal line in order to show a direction 64 of the directors of liquid crystal molecules and a direction 65 of the refractive index anisotropic axis of the optical compensation layer 63. Here, the signal lines 1, scanning lines 16, island-shaped amorphous silicon 18, pixel electrodes 3, opposing electrodes 2, polarization direction 48 of the polarizer, polarization direction 46 of the analyzer and so forth have same constructions as those of the fourth embodiment (refer to FIGS. 19 to 21).

Similarly as in the fifth embodiment, the two orientation films 57 and 58 are subject to orientation processing (rubbing) in the same direction (same direction as the direction 24 of FIG. 20). The direction of the directors 64 of liquid crystal molecules varies in a liquid crystal layer 66. While projections of the directors of all liquid crystal molecules on the plane of the substrate extend in the same direction parallel to the polarization direction 48 of the polarizer 5, the angle defined between the directors of liquid crystal molecules and the plane of the substrate is different between that on the light incoming side substrate interface and that on the light outgoing side substrate interface. Where the angles are represented by $\theta_1$ and $\theta_2$, respectively, the angle $\theta_{LC}(z)$ of the directors with respect to the plane of the substrate continuously varies between the two interfaces and is distributed so as to minimize the strain energy.

The polarization axis of the light incoming side one (polarizer) 5 of the two polarizing plates adhered in such a manner that the two substrates are held between them extends in parallel to the rubbing direction 24 (refer to FIG. 20), and the polarization axis of the light outgoing side polarizing plate (analyzer) 34 extends in a direction perpendicular to the rubbing direction 24 (refer to FIG. 20).

The optical compensation layer 63 has a negative one axis refractive index anisotropy and is set such that a projection of the refractive index anisotropic axis on the plane of the substrate always extends in parallel to projections of the polarization direction 48 of the polarizer and the directors of liquid crystal molecules on the plane of the substrate. Further, as seen in FIG. 25, the angle defined between the refractive index anisotropic axis 65 of the optical compensation layer and the plane of the substrate varies in the inside of the layer, and this angle is a function $\theta_F(\xi)$ of the coordinate $\xi$ in the depthwise direction. $\theta_{LC}(z)$ and $\theta_F(\xi)$ are set so as to satisfy the following relations:

$$\theta F(\xi) = \theta_{LC}(z) \tag{22}$$

$$\xi = z \cdot d_F / d_{LC} \tag{23}$$

where $d_F$ is the thickness of the optical compensation layer, $d_{LC}$ the thickness of the liquid crystal layer, and $\theta_{LC}(z)$ the angle defined between the directors of liquid crystal molecules at the position of the depth z in the liquid crystal layer 66 and the plane of the substrate.

$\theta L_C(z)$ is distributed in accordance with the following expression:

$$\theta_{LC}(z) = \theta_1 - \theta_2 \cdot \frac{z}{d_{LC}} + \theta_2 \tag{24}$$

If the direction of the refractive index anisotropic axis of the optical compensation layer is varied so as to satisfy the relationship given above, slab surfaces corresponding to each other compensate for each other, and accordingly, the efficiency is high.

It is to be noted that the material of the liquid crystal and the cell thickness are same as those of the fourth embodiment, and the product $\Delta n_F \cdot d_F$ between the refractive index anisotropy $\Delta n_F$ and the layer thickness $d_F$ of the optical compensation layer is equal to the product of the refractive index anisotropy and the layer thickness of the liquid crystal layer and 302 nm in the present embodiment.

In the present embodiment, since the optical main axis in the liquid crystal layer varies in the thicknesswise direction z, by varying $\theta_F(\xi)$ in accordance with the variation, a further better visibility angle characteristic of a black display can be obtained comparing with the fifth embodiment.

Figure 26:
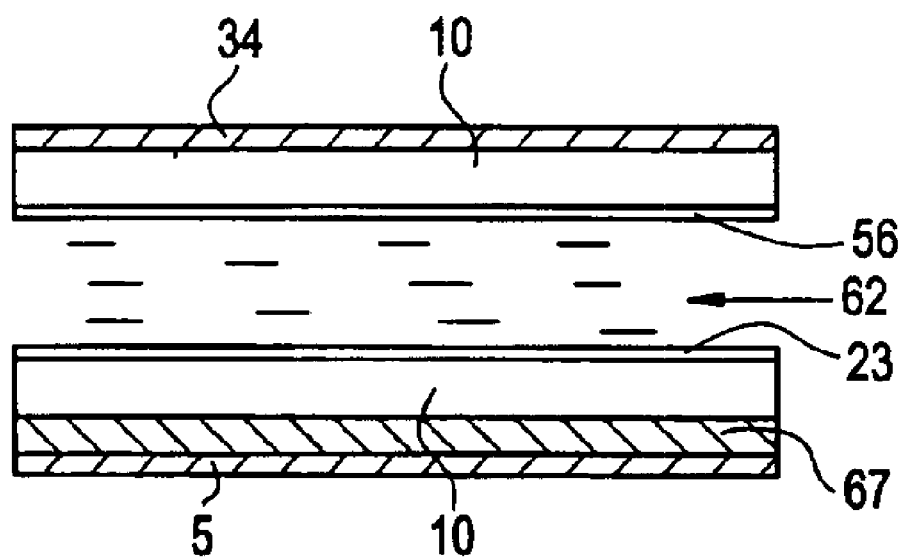
FIG. 26 is a sectional view of an active matrix liquid crystal display panel of a sixth embodiment.

In the three embodiments described above, an optical compensation layer is provided between the analyzer 34 and a glass substrate 10. However, an optical compensation layer 67 may otherwise be held between the polarizer 5 and a glass substrate 10 as seen in FIG. 26. In this instance, almost similar effects can be obtained if the construction such as the direction of the refractive index anisotropic axis of the optical compensation layer 67 is the same as that in one of the three embodiments described above.

Figure 27:
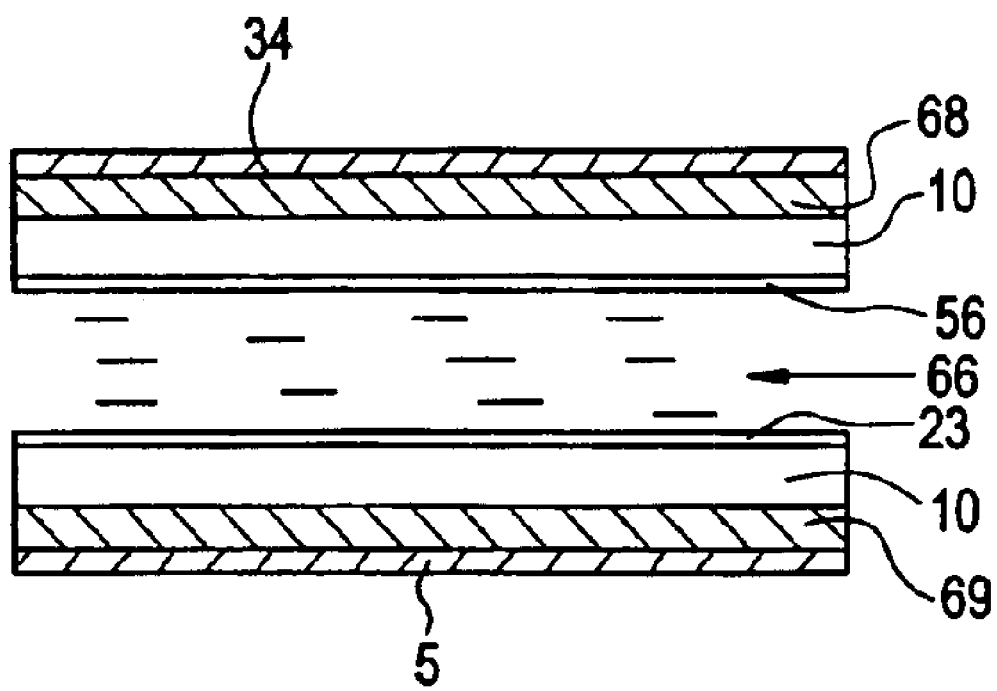
FIG. 27 is a sectional view of an active matrix liquid crystal display panel of an eighth embodiment.

Meanwhile, a further construction may alternatively be employed wherein, as shown in FIG. 27, optical compensation layers 68 and 69 are provided both between the analyzer 34 and one of the glass substrates 10 and between the polarizer 5 and the other glass substrate 10. If the directions of the anisotropic axes of them are set parallel to each other and the sum of products of $\Delta n$ and $d$ of the two optical compensation layers is set equal to $\Delta n_{LC} \cdot d_{LC}$ of the liquid crystal layer 4, then almost complete compensation can be achieved.

Further, while, in the embodiments described above, projections of the polarization axis of the polarizer and the directors of liquid crystal molecules on the plane of a substrate are set parallel to each other, similar effects can be obtained even if projections of the polarization axis of the analyzer and the directors of the liquid crystal on the plane of the substrate are set parallel to each other and the polarization axis of the polarizer is set perpendicular to them.

As described above, according to the present invention, since an optical compensation layer having a negative one axis refractive index anisotropy in an active matrix liquid crystal display panel, a retardation produced in a liquid crystal layer can be canceled to suppress white floating of a black display portion and gradation reversal can be suppressed significantly, and an image characteristic which is good in a wider visibility angle can be obtained.

What is claimed is:

1. An active matrix liquid crystal display panel, comprising:

a first substrate on which a plurality of color layers having transmission wavelengths different from each other are provided in parallel to each other;

a second substrate disposed in an opposing relationship to said first substrate with a predetermined clearance left from said first substrate for generating a predetermined electric field when a predetermined voltage is applied; and a liquid crystal layer formed form liquid crystal injected in a gap defined by a surface of said first substrate adjacent said second substrate and a surface of said second substrate adjacent said first substrate;

the electric field generated by said second substrate being substantially parallel to said liquid crystal layer to control a display;

said liquid crystal layer having a thickness which varies depending upon the transmisson wavelength of said color layers, wherein said liquid crystal layer has a thickness which is increased in proportion to one wavelength selected from a wavelength region in which transmission of factors of said color layer are higher than 70% of those at peaks of transmission spectra of said color layers; and wherein said second substrate includes a plurality of pixel electrodes provided corresponding to said color layers, the predetermined voltage being applied to said pixel electrodes, and a plurality of opposing electrodes provided in parallel to said pixel electrodes for each of said color layers for cooperating, when the voltage is applied to said pixel electrodes, with said pixel electrodes to generate the electric field therebetween, said pixel electrodes and said opposing electrodes being spaced from each other by distances which are different for the individual color layers.

2. An active matrix liquid crystal display panel as claimed in claim 1, wherein said first substrate has a protective layer provided on a surface thereof adjacent said second substrate for preventing elusion of impurities from said color layers.

* * * * *